J. P. TARBOX.
INTERLOCKING BALANCING SYSTEM.
APPLICATION FILED FEB. 7, 1913.

1,367,839.

Patented Feb. 8, 1921.
6 SHEETS—SHEET 1.

Witnesses

Inventor
John P. Tarbox

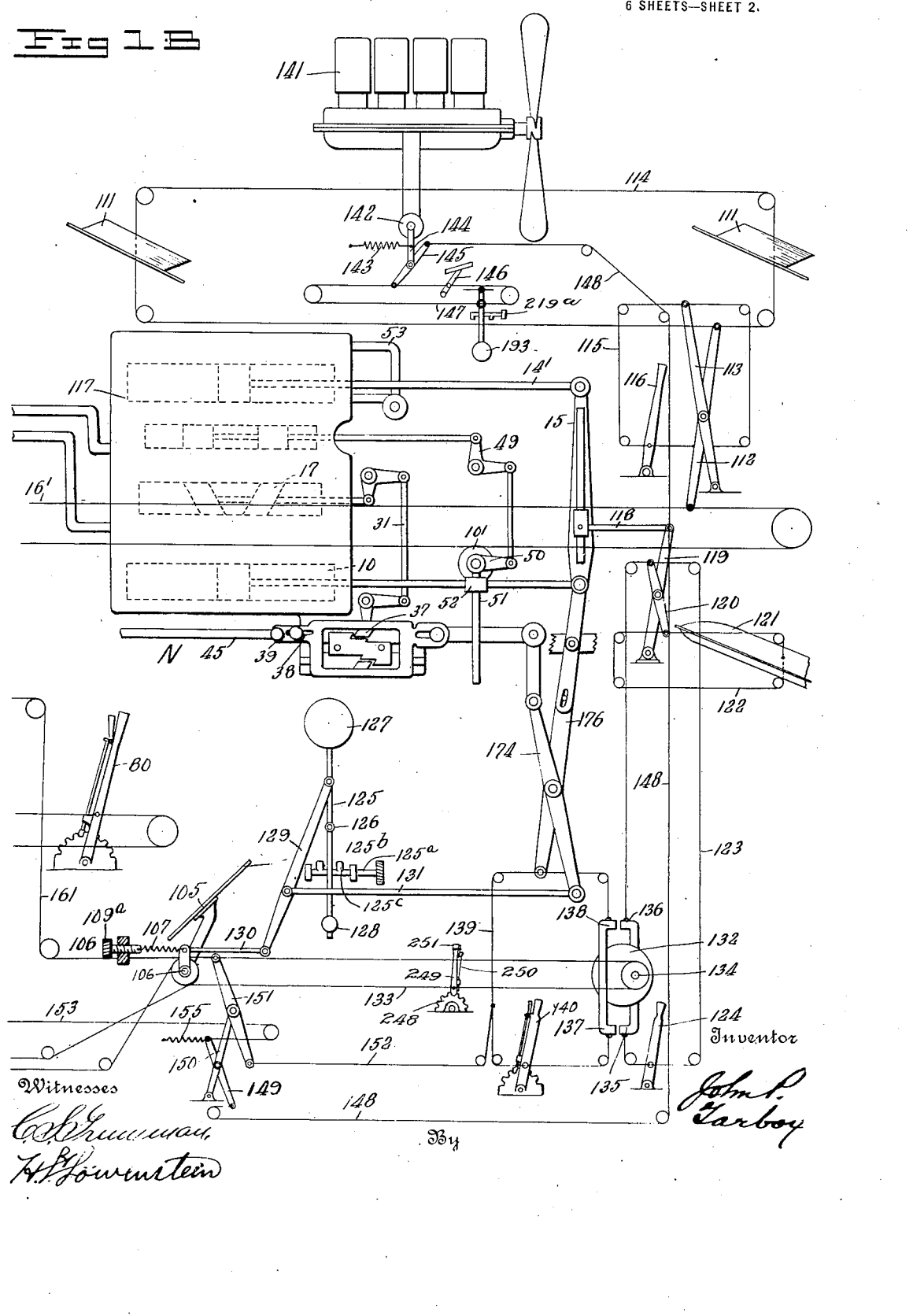

J. P. TARBOX.
INTERLOCKING BALANCING SYSTEM.
APPLICATION FILED FEB. 7, 1913.
1,367,839.
Patented Feb. 8, 1921.
6 SHEETS—SHEET 3.
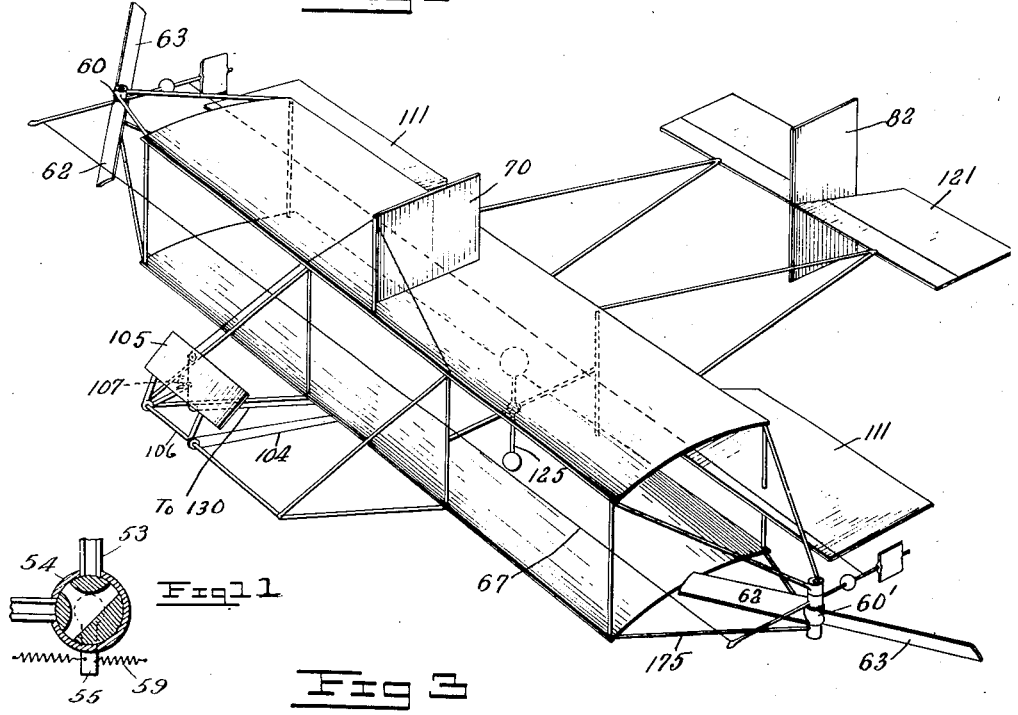
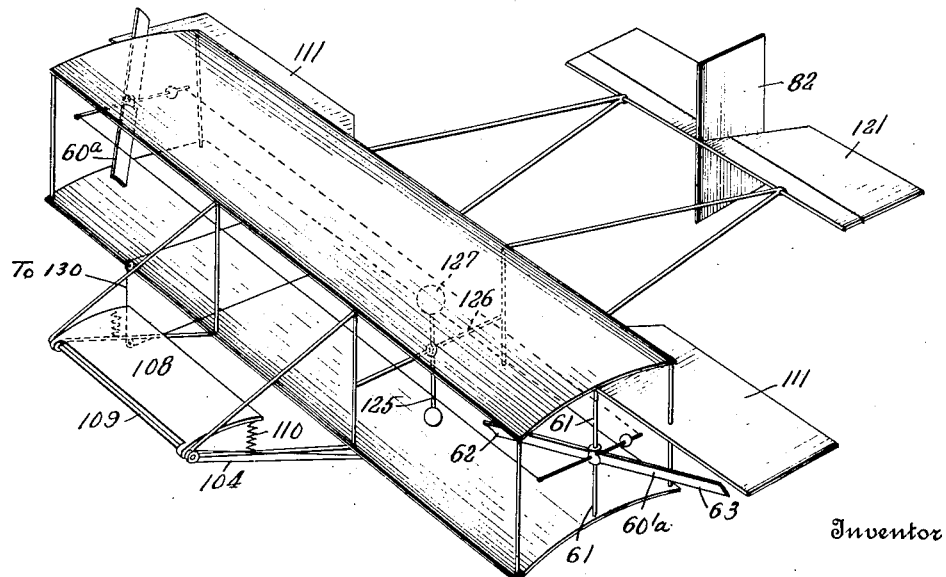
Witnesses
Inventor J. P. TARBOX.
INTERLOCKING BALANCING SYSTEM.
APPLICATION FILED FEB. 7, 1913.
1,367,839.
Patented Feb. 8, 1921.
6 SHEETS—SHEET 4.
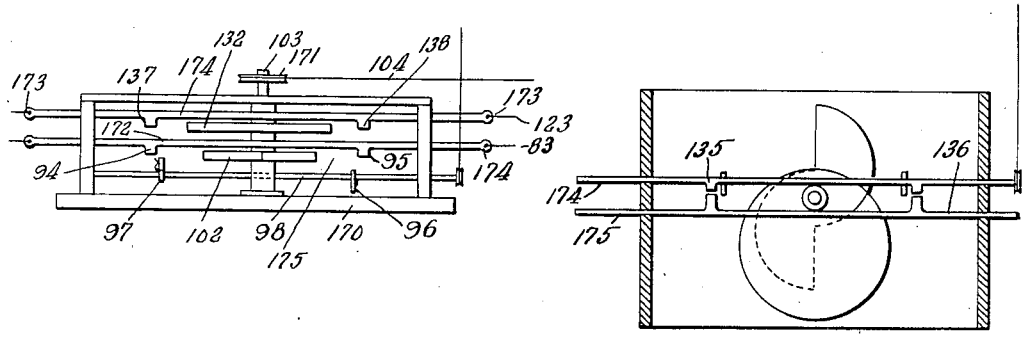
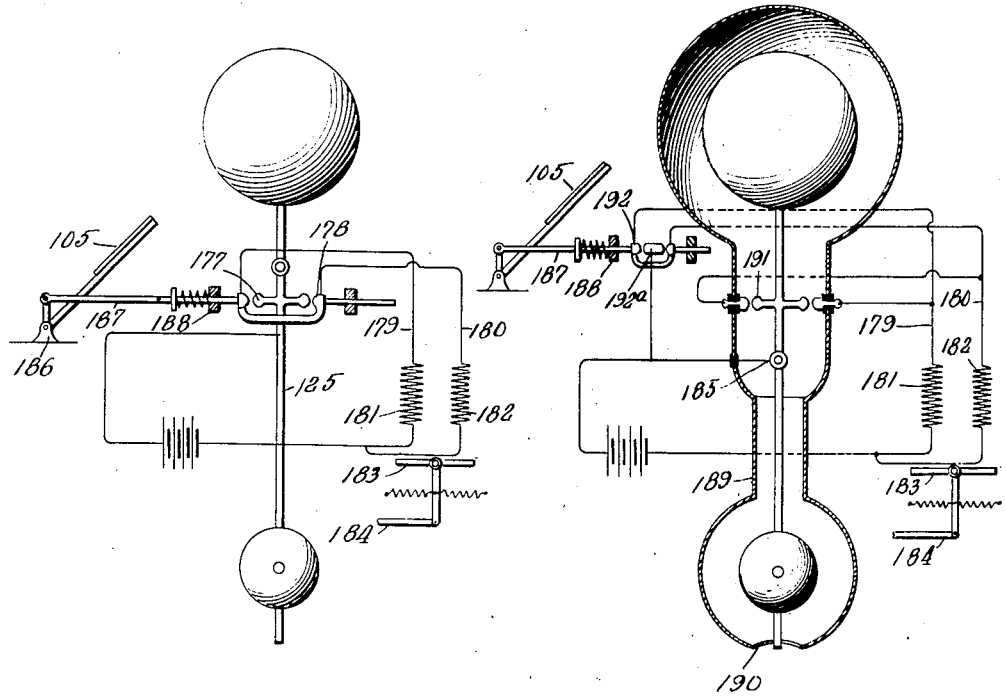
Witnesses
Inventor

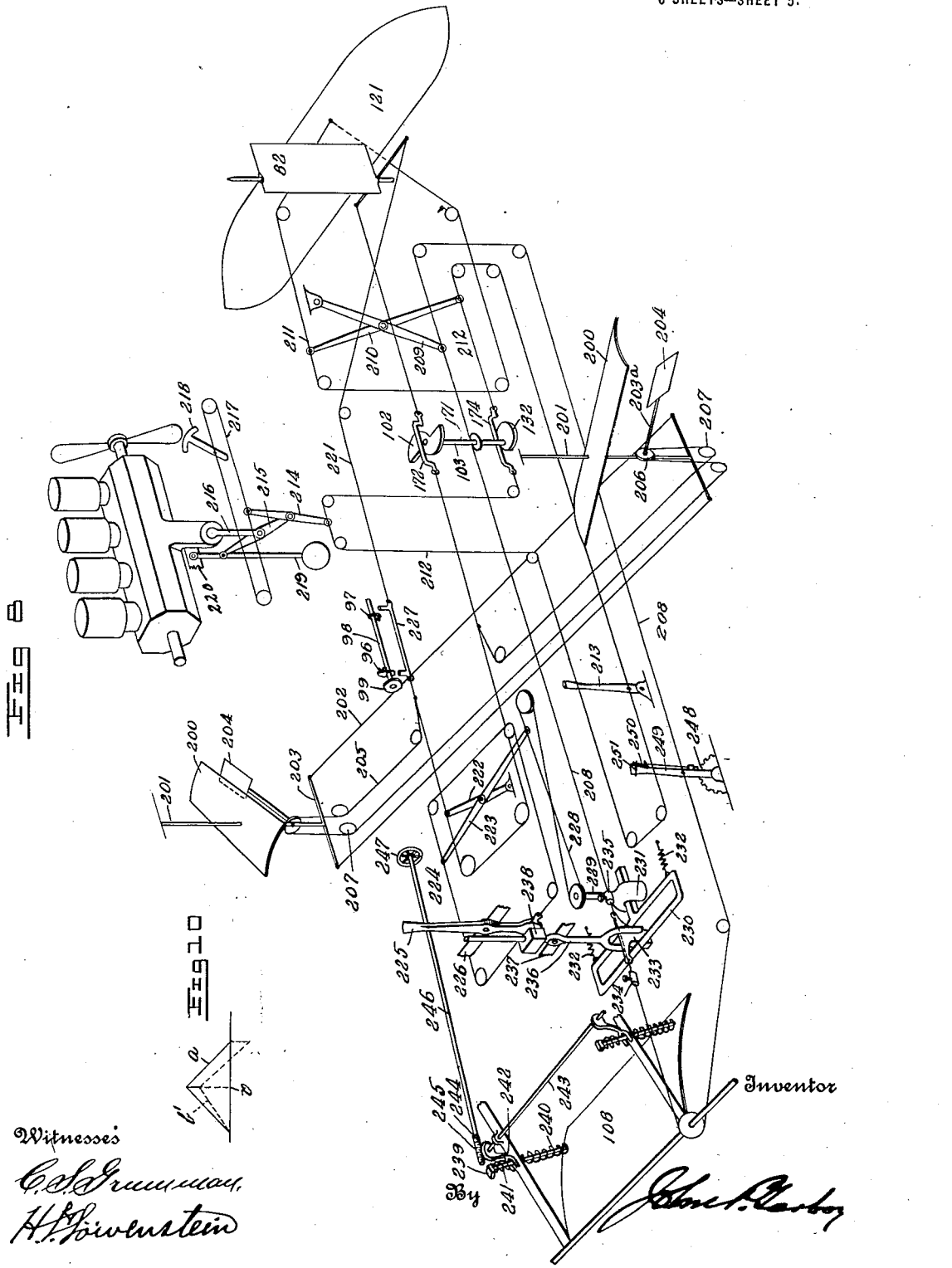

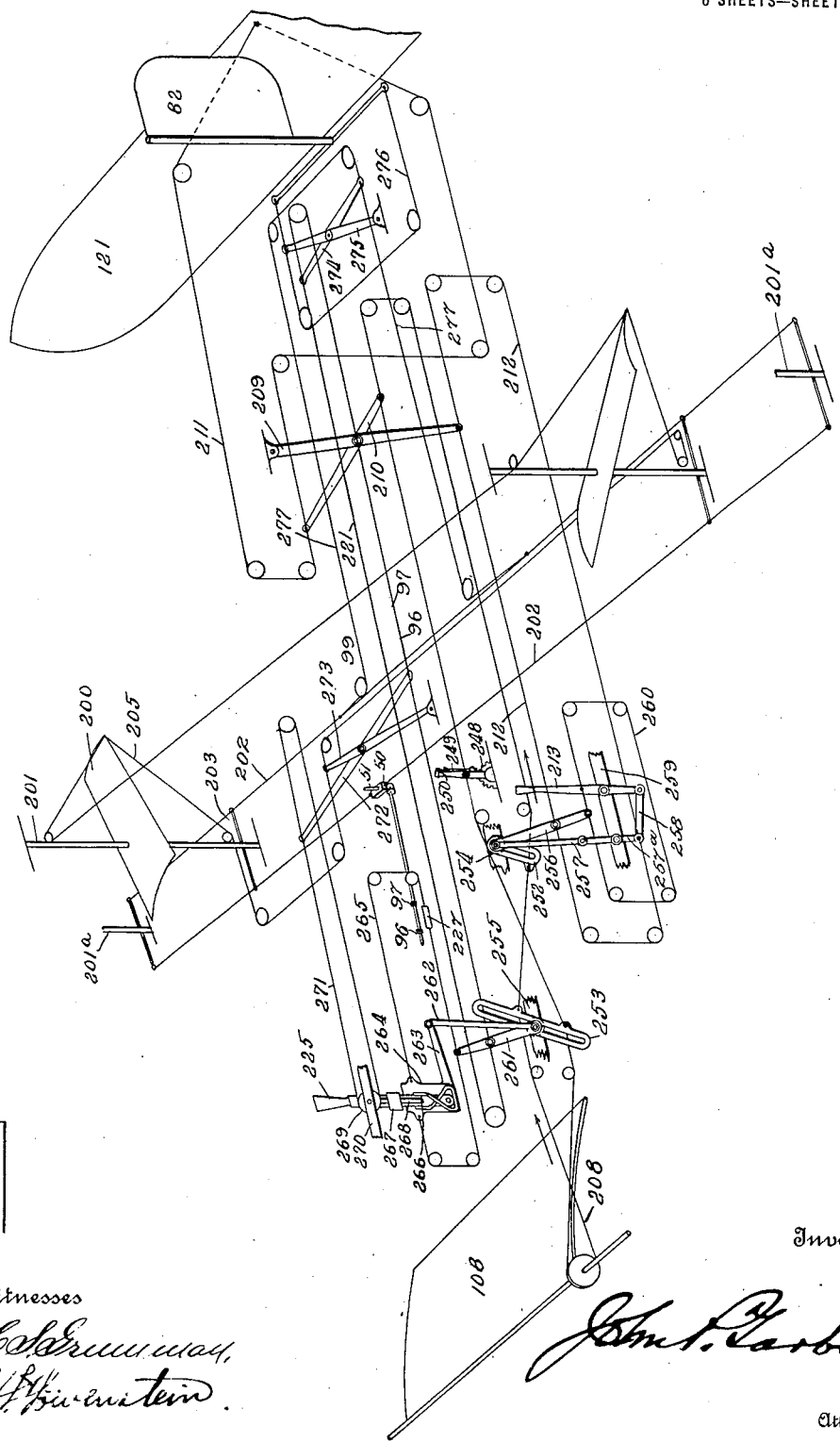

UNITED STATES PATENT OFFICE.

JOHN P. TARBOX, OF WASHINGTON, DISTRICT OF COLUMBIA, ASSIGNOR TO TARBOX SAFETY AIRCRAFT CO., OF WASHINGTON, DISTRICT OF COLUMBIA, A CORPORATION OF DELAWARE.

INTERLOCKING BALANCING SYSTEM.

1,367,839.   Specification of Letters Patent.   Patented Feb. 8, 1921.

Application filed February 7, 1913. Serial No. 746,919.

*To all whom it may concern:*

Be it known that I, JOHN P. TARBOX, a citizen of the United States, residing at Washington, in the District of Columbia, have invented certain new and useful Improvements in Interlocking Balancing Systems, of which the following is a specification, reference being had therein to the accompanying drawings.

My invention relates particularly to automatic balancing systems for air craft of the heavier than air type. While having this particular relation however, it will be obvious upon an understanding of my invention that the same may be used as a whole or in part in connection with other types of air craft.

This system is an improvement upon previous systems in a large number of respects inasmuch as there are combined to constitute the system elemental governing and controlling devices which collectively act to preserve the balance of the craft under practically every conceivable abnormal condition. The system further is possessed of a greatly increased operating efficiency and regularity, uniformity and simplicity of operation.

The system is delineated for the most part diagrammatically in the accompanying drawings in which Figure 1$^A$ is a diagrammatic illustration of one-half of the same showing particularly that part of it pertaining to the lateral balancing of the craft.

Fig. 1$^B$ is a similar diagram showing that part of the system pertaining more particularly to the longitudinal balancing of the craft, Figs. 2 and 3 are perspective views of aeroplanes in flight showing the location of the governing devices on the craft.

Figs. 4 and 5 are front elevation and plan view respectively of an interlocking device of which I make use, and Figs. 6 and 7 are diagrammatic illustrations of modified forms of connections for certain governing devices applicable particularly to the control of longitudinal balance.

Fig. 8 is a diagrammatic illustration arranged in perspective of an embodiment of my invention excluding power operated mechanisms.

Fig. 9 is a similar view of another embodiment of the same.

Fig. 10 is a diagram showing a method of setting up checking forces through the use of mechanisms of the type of Figs. 1$^A$ and 1$^B$.

Fig. 11 is a sectional detail of the valve 54 of Fig. 1$^A$.

Figure 1A:
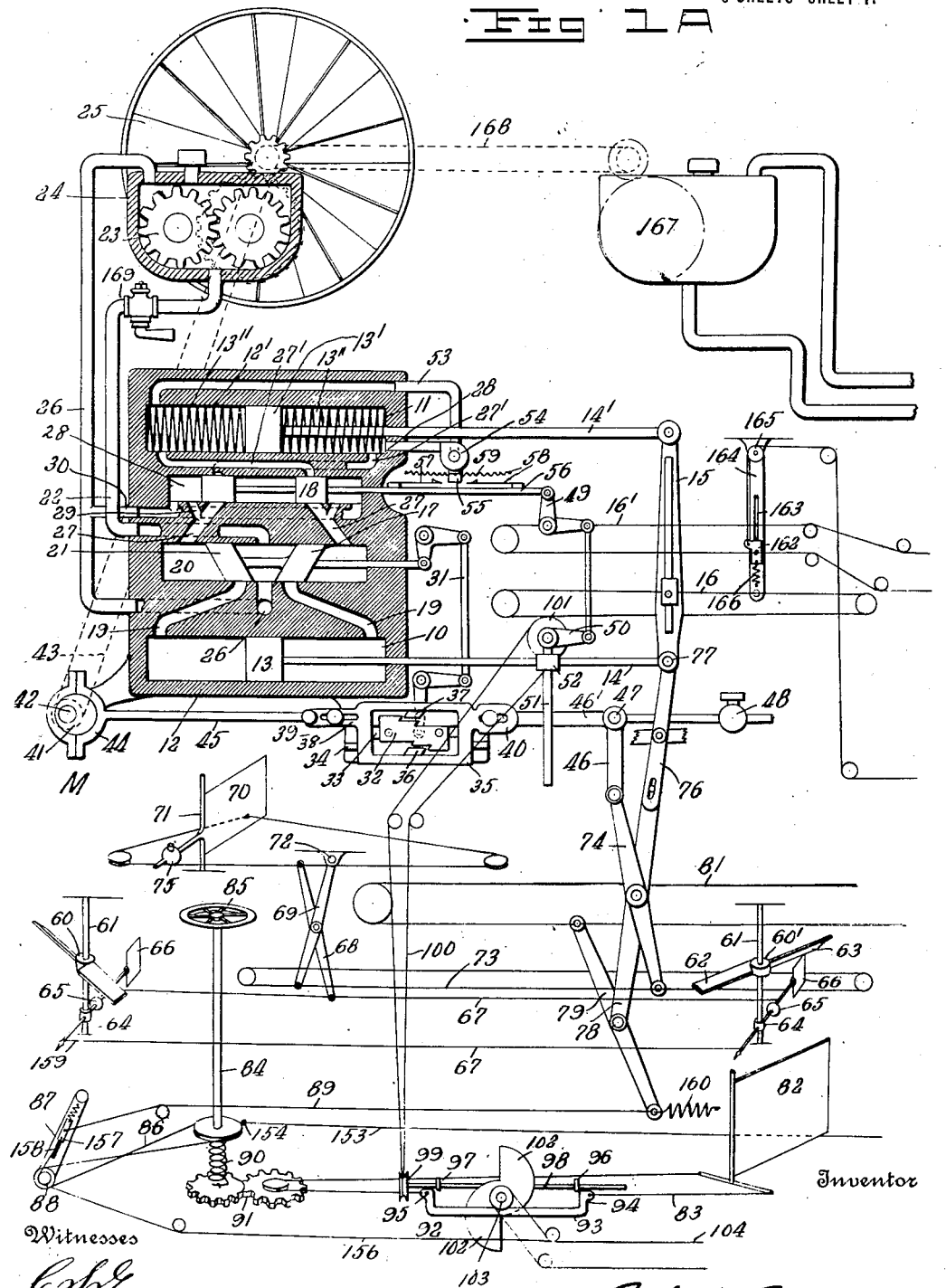

The system includes in combination both longitudinal and lateral automatic balancing mechanisms. The principal element in each of these mechanisms is in this embodiment of my invention a power operated position controlled motor device for operating the balancing rudders in accordance with the variance of the craft from its normal position. These motor devices are designated generally M and N respectively.

Referring to Fig. 1$^A$, the device M comprises primary and secondary fluid pressure motors 10 and 11. While fluid pressure motors are shown and described, any other type of motor may be used if desired, such for instance as an electrical motor. The motors are reciprocating motors, comprising cylinders 12 and 12′ in which are located pistons 13 and 13′ which occupy normally positions centrally of the cylinders. Their rods 14, 14′ connect through connecting lever 15 with cord connections 16 which are connected by intermediate means to lateral balancing rudders shown in Fig. 1$^B$.

Intermediate the cylinders 12 and 12$^a$ are two controlling valves, the one 17 of which controls the admission and exhaust of fluid from cylinder 12, and the other of which 18 controls the admission of fluid and hence the application of power to cylinder 12′. Coöperating with valve 17 are passages 19 which enter opposite ends of cylinder 12. They terminate at their outer ends in valve chamber 20 and are normally both closed by sections 21 of the piston valve 17. Intermediate the sections 21 fluid under pressure is admitted centrally of the valve chamber through a duct 22 from a source of pressure 23 or other source of power. The sections 21 of valve 17 are inclined on their adjacent ends so that in the movement of the valve, the passage 22 is never closed.

The source of fluid pressure 23 comprises in this embodiment a gear pump located within a tank 24 and driven by a continuously rotating wind motor 25. This motor may be of any type whatsoever. The wind motor 25 may be located on any part of the air craft where it is subject to wind pressure due to motion of the craft through the air. As long as the craft moves, this motor operates and drives the pump 23 unless it is disconnected from the pump by means of a clutch or stopped by other well known means. The pump circulates fluid under pressure through passage 22 and through the normally open by-pass 26 through which the circulated fluid is returned to tank 24.

Opening from opposite ends of valve chamber 20 are exhaust ports 27 communicating with opposite ends of valve chamber 28 and normally closed by the two-part piston controlling valve 18. By-passes 29 connect the exhaust ports 27 normally with a branch conduit 30 communicating with by-pass 26.

The main controlling valve 17 of motor 10 is operated through bell-crank connections 31 with a reciprocable block 32 adapted to slide back and forth in a slot 33 in a relatively fixed support 34. The block 32 is provided with teeth in the manner disclosed in my copending application Serial Number 641,662. As clearly shown, there are two teeth on each side of the block at different distances from the center of the block in both vertical and horizontal planes. A surrounding frame 35 reciprocable parallel to the block 32 carries upper and lower inwardly projecting claws 36—37 adapted to engage teeth on block 32. One end 38 of frame 35 is reciprocably pivoted to a fixed point 39, while the other 40 is movable up and down about the pivot 39. An eccentric 41 mounted on a shaft 42 continuously driven as indicated by dotted line 43 from the wind motor 25, is connected by strap 44 and rod 45 to the end 38 of frame 35 to reciprocate the same.

The end 40 of the reciprocating frame 35 is pivotally connected reciprocably with one end of bell crank 46 pivoted to fixed point 47 and counterweighted by the adjustable mass 48 on the opposite side of pivot 47 from the arm 46' supporting the weight of frame 35. The mass 48 is made sufficient to counterweight both the imposed weight of the end 40 of frame 35 and the weight of the arm 46'. Through the movement of bell crank 46 frame 35 may be moved up or down to reciprocate the block 32 through the engagement of its claws 36, 37 with the teeth of block 32.

The secondary control valve 18 is operated through bell crank connection 49 with the lost motion device connected with piston rod 14 of the primary motor 10. This lost motion device comprises a lever 50 pivoted closely adjacent the line of movement of piston rod 14 and having connected therewith rigidly a rod 51 projecting at right angles to the piston rod 14 and through a link 52 pivoted or swivelly connected therewith, whereby upon the initial movement of the rod 14, due to the close proximity of link 52 to the pivot of lever 50, lever 50 is given a very large movement, and thereafter the rod 51 having been moved to a position approximately parallel to the rod 14, there is no substantial additional movement of lever 50. The operation of the lost motion device 50, 51, 52 is the same irrespective of the direction of movement of the lever 14. The lost motion device shown is of a well known type, and any other well known type may be substituted therefor.

Connecting the opposite ends of the secondary motor cylinder 12' is a motor by-pass 53 which is normally closed but adapted to be opened by a valve 54 operable through lever 55. On the valve stem 56 of valve 18 are carried two spring pawls 57—58 adapted to engage over the end of lever 55 when valve 18 has been moved to an extreme position, and during the return movement thereof to momentarily open valve 54. Due to the arc of movement of the end of lever 55, this lever is automatically disengaged from pawls 57—58 after a predetermined movement thereof and is returned to its normal central position and held there by oppositely acting springs 59, see Fig. 11.

Connecting with bell crank lever 46 operating through relay 32—35, is a standard of position responsive combinedly to variations in wind pressure and position of the craft from normal. This standard comprises a pair of vanes 60—60' located respectively (see Figs. 2 and 3) at opposite sides of the craft. The vanes are mounted on substantially vertically extending axes 61 and have movement in unison thereabout. Preferably they lie in a substantially horizontal plane, but they may be inclined thereto in the direction of their lengths. In the direction of their widths, the vanes 60—60' are inclined to the horizontal, the portion thereof 62 on one side of the axes 61 being inclined oppositely to the portion 63 lying to the other side thereof. Thus under wind pressure in the direction of flight, air acting on portions 62 will tend to depress the vanes, while air acting on portions 63 will tend to elevate the vanes. Thus further under an upward draft of air the vanes will tend to rotate in one direction while under a downward blast of air they will tend to rotate in the opposite direction. Thus also under the action of air either up or down at angles oblique to the vertical and varying in direction through the entire range from the horizontal to the vertical, there will result unbalancing of pressure with respect to the opposite ends 62—63 of the vanes, giving rise to a torque about the axes 61 proportional combinedly to the direction of the wind pressure and its amount.

One end as 63 of these vanes is made longer than the other, whereby there is normally as respects wind pressure in the line of flight or air rush, an unbalancing of the same with respect to axes 61 and a resulting bias of vanes 60—60' toward a position of least head resistance in which they are substantially parallel in length to the line of flight or to the air rush. This unbalanced condition may be brought about by other means such for instance as making the angle of inclination of one part as 63 different from that of the other part 62 on the opposite side of the axis, or by increasing the width of the end 63 as respects the end 62, or in any other way increasing the surface projection of one side of the vane over and above the surface projection of the other in a plane normal to the width.

Rigidly connected with the vanes 60—60' through their axes 61 are longitudinally extending arms 64 substantially parallel to the line of flight and carrying each an adjustable weight 65 and an adjustable tail vane 66. As respects the arms 64 and the longitudinal axis of the air craft, the vanes 60—60' are positioned at equal and opposite angles of obliquity as clearly shown. They are retained normally in this position by connecting cords 67 between the opposite ends of the arms 64, being thus normally retained in said positions against the bias due to the unbalancing of the opposite sides 62—63 as aforesaid. Also through connections 67 they are compelled to move in unison.

One cord 67 connects with one end of differential lever 68 of the pair 68—69, while the other end of lever 68 is connected with a vertical wind direction vane 70 mounted on a mast 71 centrally of the craft (see Figs. 2 and 3). One end of lever 69 is pivoted to fixed point 72 as usual with this type of differential, while the other end connects through cords 73 with one end of lever 74. The opposite end of 74 is connected with bell crank lever 46, whereby primary control valve 17 is operated. A counterbalancing weight 75 is adjustably connected with vane 70 whereby in lateral directions it is made free from the effects of gravity.

Lever 74 is centrally pivoted to lever 78 of a follow-up device comprising lever 76 and its connection pivotal point 77 to piston rod 14 and through lever 78 connected at one end to lever 76 and at the other to a normally fixed lever 79.

Hand controlled lever 80 (see Fig. 1ᴮ) is connected by cord 81 to one end of lever 79, the lever 80 being provided with a latch as shown for normally holding it in any position to which it may be operated.

82 is in the vertical steering rudder of the craft. It is connected by operating cords 83 and intermediate devices to a steering post 84 provided with a steering wheel 85. Connected with steering post 84 by cords 86 is a lever 87 pivoted at one end 88 to a fixed part and connecting at the other end by cord 89 with the end of the lever 79 opposite to that to which hand controlled lever 80 is connected through cords 81.

The connections of steering post 84 to rudder 82 include a yielding means as a spring 90, a lost motion connection 91 (shown as Geneva gears, although it may be of the type of connection 50—51—52 above described), and a limit device 92. The yielding connection permits movement of the steering post 84 in either direction without corresponding movement of rudder 82, while the lost motion device 91 as clearly shown permits a limited amount of initial movement of steering post 84 without motion of rudder 82, which during the initial movement is located in its central position. The limit device 92 comprises a link 93 in series with cord 83, movable in opposite directions therewith and having opposed abutting portions 94, 95. Coöperating with these portions 94, 95 are oppositely disposed abutments 96, 97 carried by a shaft 98 mounted in suitable bearings parallel to link 93. Normally the stops 96, 97 do not project into the path of abutments 94, 95, but by rotating the shaft 98, one or the other of them may be so projected, depending upon the direction of rotation of the shaft 98. A pulley 99 is provided on the end of this shaft and connected by cords 100 with a pulley 101 connected with piston rod 14 of the primary motor through lost motion device 50, 51, 52, whereby when the rod 14 moves in one direction, stop 96 is interposed in the path of movement of abutment 93, and whereby when the rod 14 is moved in the opposite direction, stop 97 is projected into the path of abutment 95.

Also coöperating with abutments 94, 95 is a second limit stop device comprising oppositely disposed lobes 102 of variable radius mounted to be rotated on pivot 103 in the line of movement of abutments 94, 95. The limit device 102 is connected through cords 104 to be rotated in response to variations in wind pressure upon pressure responsive device 105 (see Fig. 1ᴮ). In this embodiment this pressure responsive device comprises a geometrically plane surface mounted to move about a laterally extending horizontal axis 106 (see also Fig. 2) and normally occupying a position of substantially 45° inclination to the horizontal. That particular angle should be chosen which will give the best range of regulation as this can readily be determined by reference to the characteristic curves of the particular surface 105 used. This device is biased forwardly against wind pressure by a spring 107. Instead of the device 105 just described, any of the pressure responsive devices now well known in the art may be used and connected to impart motion through cords or other transmission 104 to limit device 102 in response to variations in wind pressure. One of the devices now well known to the art is shown in Fig. 3 and comprises a lifting surface 108 pivoted at its forward end to a laterally extending horizontal axis 109 and biased downwardly against the lifting force of the air by springs 110. Through cords 104 connected with the axis 109 or in any other way with the surface 108, the motion of the surface of 108 is communicated to limit device 102.

The power operated motor mechanism comprising primary and secondary motors 10 and 11, is connected through cords 16—16' as aforesaid with balancing devices 111 shown in the form of ailerons or lateral balancing rudders. Instead of connection to the ailerons 111, connection may be made to other forms of lateral balancing devices such as warping wing tips, etc. Connection from cords 16 to balancing devices 111 is made through lever 112 of the pair of differential levers 112—113. Lever 112 connects at one end to cord 16' and at the other end to cord 114 through which the balancing devices 111 are coupled together. One end of lever 113 is fixed as usual while the other end is connected by cord 115 with a manually operated lever 116 which latter may be provided with a latch to hold it in any adjusted position similar to the lever 80 if desired.

Also mounted on the air craft, and operating in a plane substantially at right angles to the motor mechanism 10—11 previously described, is a second motor mechanism essentially the same as the motor mechanism 10—11 and designated generally 117. This mechanism instead of operating lateral balancing devices 111 through connections as cords 16, etc., is connected by link 118 to one lever 119 of differential 119—120 to operate the horizontal elevating rudder 121 which is connected to one end of lever 120 by operating cords 122. The end of lever 119 opposite link 118 is connected to a fixed point, while the end of lever 120 opposite that connected to cord 122 is connected by cord 123 to operating lever 124 of a hand controlled device similar in all essential respects to hand lever 116 for operating the lateral balancing devices 111.

The motor device 117 differs from the device 10—11 only in that the means for governing the same is different. Instead of being governed from laterally disposed vanes 60—60' as is the mechanism 10—11, the mechanism 117 is governed combinedly by the pressure responsive device 105 and a gravity controlled standard of position 125. This gravity controlled standard of position is as shown of the pendular type, and is mounted on a relatively fixed pivot 126. The controlling force is derived not through a weight but through a balloon or air float 127 affixed to the upper end of the pendulum rod. Weight 128 at the lower end thereof is adjustable and for the purpose of counterbalancing the weight of the device 127 and the rod above pivot 126, whereby the standard of position is undisturbed by forces applied through its pivotal point of support 126, for the pivotal point 126 then constitutes the centroid of the device.

Any known type of standard of position with respect to the earth, such as pendular, gyroscopic, etc. may be substituted therefor. This gravity controlled standard of position is connected to one end of the differential lever 129, which lever is connected at its other end through link 130 with pressure responsive device 105, and at an intermediate point through link 131 with the lower end of lever 174 of mechanism 117 whereby the combined movements of the pressure responsive device 105 and of the craft with respect to the standard 125 govern the operation of the horizontal rudder 121 through mechanism 117. A separate device 105 may be used for this government of mechanism 117 if desired, but it is convenient to use for this purpose the same one which operates the limit device 102.

Also connected to pressure responsive device 105 is a second limit device 132, connection being made by cords 133. Limit device 132 comprises an eccentrically mounted substantially circular disk adapted to be revolved about its axis 134 when the pressure responsive device 105 moves. In series with operating cord 123 from the manual operating lever 124 is a pair of abutments 135—136 similar to the abutments 94—95 in cord 83 connecting with the vertical rudder 82. These abutments are in the plane of the disk 132 and when the lever 124 is moved back and forth to operate the horizontal rudder 121, the disk 132 limits the movements thereof through the engagement of the abutments 135—136 with the disk 132.

Also coöperating with the limit device 132 is a second pair of limit stops 137—138 included in series with an operating cord 139 connecting with a manual operating lever 140 and also with the lower end of the follow-up lever 176 of the mechanism 117. Through the movement of this lever 140 the lever 176 may be adjusted by hand to effect any desired operation of the mechanism 117. The lever 140 may be provided with locking means shown or not as desired.

At the top of Fig. 1$^B$ is shown the propelling engine 141 together with its throttle or other power controlling device 142. This throttle is biased to open position by a spring 143 connected to the lever 144. Throttle lever 144 is connected through differential lever 145 with a direct foot or hand control lever 146 through cords 147.

Additionally from the opposite end of differential lever 145 throttle lever 144 is connected by cord 148 to one end of lever 149 of the set of three differential levers 149—150—151. Lever 149 is pivoted centrally upon lever 150, one end of which is pivoted to a fixed point, while the other end is connected centrally of lever 151. Lever 151 is connected at its upper end to pressure responsive device 105 through operating cords 133 of the limit device 132, and at its lower end to manual operating lever 140 of the mechanism N through cord 152. The opposite end of lever 149 from that connected to cord 148 is connected by cord 153 to a normally centrally positioned arm 154 on the steering shaft 84. A spring 155 biases the upper end of lever 149 to the left, thus keeping the cord 153 under tension. The connections shown are principally diagrammatic and obviously the parts may be connected together in the same operative relation by any one of a number of well known means.

Besides being connected to the throttle lever 144 in the manner just described, the pressure responsive device 105 has interconnection with two other parts of the system. Through extension 156 from cords 104 connecting with the limit device 102 of the vertical rudder 82, connection is made with sliding block 157 in slot 158 of lever 87, the block 157 being biased to one extreme position by spring 159 and being moved back and forth therefrom through movement of cord 156 by pressure responsive device 105. The block 157 connects directly with cord 89 previously described as connected with lever 79 of motor mechanism 10—11. Lever 79 is kept in normal position, and cord 89 under tension by spring 160 to a fixed point.

Through cord 161 pressure responsive device 105 is connected to sliding block 162 in slot 163 of an amplitude lever 164 between the cords 16 and 16'. The amplitude lever is pivoted to fixed point 165 and is permanently connected by primary cord 16 to the yoke lever 15 of the mechanism 10—11. Secondary cord 16' connects directly with block 162 whereby when the block 162 is moved back and forth from its extreme position to which it is biased by spring 166, the amplitude of movement of balancing devices 111 through secondary cord 16' is varied.

It is to be herein understood that all cord connections are of such extent that there may take place ample amount of free lateral movement thereof whereby free movement of the levers and other devices to which the cords are connected is unimpaired.

Supplying power to the mechanism 117 which operates the horizontal rudder 121 is a second pumping system similar to that shown in connection with the motor mechanism 10—11. This mechanism is designated generally 167 and as indicated by dotted line 168 is driven from the same wind motor 25 which drives the pump 23.

As thus described, the operation of the mechanism of my invention and of the method thereof is as follows:

The wind motor 25 which operates at a substantially constant speed under a substantially constant wind pressure, drives the pumps 23 and 167 continuously, circulating operating fluid for the motor mechanism 10—11 and 117 respectively through the passages 22 and 26 in series, the fluid passing centrally of the valve chamber of the primary motor 10 as shown in Fig. 1$^A$. As will appear later, the wind pressure in the line of flight is maintained substantially constant through the governing action of the pressure responsive device 105 alone, or in combination with the governing action of the vanes 60—60' which are also responsive to pressure. Therefore the pressure responsive device 105 governs the speed of operation of the wind motor 25 and hence the rate of circulation of operating fluid through the motor mechanism. By means of thumb screw 109$^a$, the action of the pressure responsive device may be adjusted, whereby the normal wind pressure is determined, and consequently the speed of wind motor 25 is adjusted up or down as desired. This takes place for the reason that for each operation of spring 107 of the pressure responsive device 105, an increase or decrease of normal wind pressure is necessary to retain pressure responsive device 105 in its normal position. The speed of the wind motor 25 may be additionally regulated by throttle valve 169 in supply conduit 22, or any equivalent means associated with the motor mechanism. The point of prime importance is however, that due to the governing action of the pressure responsive device 105 the course of the craft is so directed that the wind pressure on the motor 25 is maintained at a substantially constant value and it may be counted upon to supply power for the motor mechanisms 10—11 and 117 at a determinate rate.

With the wind motor operating to supply power as described, we assume that the craft is traveling at its normal rate against wind pressure in the line of flight and that the craft is on an even keel both laterally and longitudinally. Now assume that such a variation of pressure occurs on one side of the craft as will result in the unbalancing of the craft laterally. Whether this variation occurs on one side of the craft or the other is of no moment as respects the resulting accurate corrective action of this system. As previously explained, the action of wind pressure on either of vanes 60 or 60' which are located as shown in Fig. 2 at opposite lateral extremities of the craft, in any direction other than normal, produces resulting motion of the vanes 60—60' about their axes, except under one condition, and that is that the variation in wind pressure is the same in amount and direction on both of the vanes 60—60'. If the direction of the wind pressure is normal and in the line of flight, but is greater on one side of the craft than the other, say on the side of the vane 60', then the vanes become unbalanced as respects each other, and there results movement in unison about their axes. In the instance chosen, the increased pressure of the vane 60' causes a rotation of the vanes in a counterclockwise direction (looking down on the system from above), for it is the right hand end 63 of this vane which is of the greater surface area. This counterclockwise movement continues until the angle of obliquity of vane 60' to the longitudinal has been decreased and that of the vane 60 increased to make the unbalancing pressure on the end 63 of vane 60 equal to the momentarily increased unbalancing pressure on the end 63 of vane 60'. The action of the commonly known kite is simulated in the action of these connected vanes which move in unison, and bearing the action of the kite in mind, the action of these vanes in this respect will be fully understood. An entirely similar action takes place when the wind pressure is increased on the side of the vane 60, the vanes then moving in unison clockwise instead of counterclockwise. Thus as respects increase of wind pressure on opposite sides of the craft, the resulting movements of the vanes 60—60' are opposite. This is exactly what is needed to directively control the operation of the balancing devices 111 of the craft.

The above described action is the simplest action of the vanes 60—60' under variations of wind pressure. A moment's further consideration will show however, that the character of the vanes 60—60' and their mounting is such that their action even under the most complex variations in wind pressure is accurately directive of the proper movements of the balancing devices. Thus assume an upwardly directed wind pressure on the side of the vane 60'. There immediately results counterclockwise movement of the vanes by reason of the counterclockwise torque which the upward wind pressure imposes on vane 60'. This torque if the upward wind pressure be vertical is exerted combinedly on both ends of vane 60', for the reason that the end 62 is oppositely inclined as respects end 63. There is thus attained the very strongest torque under these conditions of great disturbance. If the upward wind pressure be at any angle less than the vertical, there is still a counterclockwise torque, on each end of the vane 60' until the direction of the wind pressure coincides with the plane of the end 62 whereupon the counterclockwise torque is exerted through the end 63 only. And between this direction of wind pressure, and the direction of flight, the counterclockwise torque is decreased as the direction of the unbalancing pressure approaches more nearly to the direction of flight, the wind pressure on end 62 opposing the preponderating wind pressure on the end 63. The reverse is true of upward pressures on the vane 60 on the opposite side of the craft, the vanes being moved clockwise instead of counterclockwise.

The action of the vanes 60—60' under downwardly directed wind pressure is substantially similar to the action under upwardly directed wind pressure with the exception of the fact that the movements thereof are exactly opposite under downwardly directed pressure from what they are under upwardly directed pressure. Thus downwardly directed pressure on vane 60' results in a clockwise movement of the vanes instead of a counter-clockwise movement, and downwardly directed pressure upon vane 60 results in a counterclockwise movement instead of a clockwise movement. Under variations in the direction of wind pressure between vertical downwardly directed pressures and wind pressure in the line of flight, the action is the same with the exception that the resulting torques produced on the vanes 60—60' are proportionately reduced as the wind pressure approaches the line of flight. In this case as in the case of vertically directed upward pressure, the directive torque on the vanes is greatest when the wind pressure is approximately vertical and when the unbalancing effect of this abnormal wind pressure is greatest.

Besides being initially responsive to variations in wind pressure on opposite sides of the craft and in the direction of flight, the vanes 60—60' are also responsive to changes in the normal position of the craft. Upon an unbalancing of the craft downwardly on the side of the vane 60', the heavier weight of the ends 63 of vanes 60—60', and of the adjustable masses 65 on that side of the axis of each vane, the vanes 60—60' swing in unison clockwise. Upon an unbalancing of the craft resulting in the lowering of the side of the vane 60', the reverse is true, gravity effecting counterclockwise movement of the vanes. In these movements, as well as during movements in response to pressure variations, the vanes are suitably damped and oscillation eliminated through the movement of the small vertical longitudinally extending tail planes 66 out of their normal position, and to a position of reaction against the wind.

In initial response to pressure variations and in subsequent response to changes of the craft to its normal position, the vanes 60—60' fly with the wind, so to speak, moving in unison always to a position defining the direction of wind pressure upon the craft. When this movement takes place, it is not desired that the balancing devices 111 be operated, unless there is at the same time change in wind pressure as respects the opposite sides of the craft. By reason of the connection of the vanes 60—60' with the vertical wind direction vane 70, through the differential connection 68—69, mere movement of vanes 60—60' to accord with the direction of the wind in the plane of flight, is prevented from directing the operation of the balancing devices. This is because the arrangement of the differential permits movement of vanes 60—60' under these conditions to be annuled by a precisely proportional movement of the wind direction vane 70 which always flies with the wind. Since the vane 70 is centrally located, it is not subject to the variations in wind pressure at the lateral extremities of the craft, and since the vane is vertical even if in a position to be subject to a change in pressure, the effect on it would be quite small in comparison with the effect on the specially devised vanes 60—60'. Furthermore being counterbalanced gravitationally by mass 75, it is not subject to movement due to a change of the normal position of the craft. Thus the directive control of vanes 60—60' is not impaired in any way through change of direction of wind pressure in the horizontal plane of the machine. The compensating vane 70 may or may not be used as desired, and in air craft where the speed of travel is very high and in calm weather where cross winds of great velocity are not encountered, the device will be wholly unnecessary. In such case the interconnecting cords 67 of the vanes 60—60' are connected directly to the lever 74 of the power operated mechanism and the differential connection 68—69 omitted.

It is apparent that through the movement of lever 74 to right or left, the bell crank 46 is moved to right or left, resulting in the operation of the power controlling valve 17 of the mechanism 10—11 to right or left as above described. Now assuming that movement of the vanes 60—60' and under one of the disturbing conditions of wind pressure previously described is clockwise, lever 74 is moved through connection with cord 73 from the differential 68—69 counterclockwise about its pivot on lever 76. Bell crank 46 is moved thereby clockwise raising the end 40 of the frame 35 and thereby effecting a right hand movement of the block 32 and a resulting right hand movement of valve 17 in chamber 20. The normally open by-pass 26 is thereby closed by the left disk of the valve 17, and the right hand port 19 to the motor cylinder 10 is opened. The primary motor 10 is thus supplied with fluid under pressure from supply conduit 22 through the valve chamber 20 and port 19, thus forcing piston 13 and rod 14 to the left. This operates through lever 15 which moves about its pivot on rod 14', through connections 16, connections 16' through differential 112—113 and cords 114 to move the balancing devices 111, the left hand device 111 being moved downwardly, and the right hand device 111 being moved upwardly (looking in the direction of flight). As will be seen this will result in raising the left of the craft and lowering the right of the craft. Under all conditions, moving the vanes 60—60' clockwise, the left side of the craft is the relatively depressed or lowered side, and it is therefore seen that the directive action of the vanes 60—60' upon the operation of the balancing devices 111 is correct.

Upon the initial movement of the rod 14 to the left resulting in the aforementioned movement of the balancing devices 111, through lost motion connection 50—51—52, valve 18 of the secondary motor 11 is moved to the right, closing left hand port 29 and opening right-hand port 27 from the valve 20 of the primary motor 10. During continuation of movement of the piston rod 14 to the left however, no further movement of the valve 18 takes place, for the reason that almost immediately after the initial movement of piston rod 14, rod 51 of the lost motion device is substantially parallel to it. During this time however right-hand port 27 is covered by the right hand disk 21 of valve 17. Thus no fluid may pass through right-hand port 27 and into secondary motor 11 through the uncovered port 27' leading to the left hand end of the motor cylinder. The balancing devices 111, having been moved to a point where the corrective force established is sufficient to check the disturbing force of the craft, or check the unbalancing movement thereof, the follow-up mechanism having prevented over movement and the craft then returned toward normal position, vanes 60, 60' move therefore in the return toward normal counterclockwise, and through the connection with lever 74 reverse the position of valve 17, moving it first to its central position as shown and thereafter (by reason of the abnormal position of the follow up levers 76, 78) to its left hand position in which the right hand port 19 communicates with the now open right-hand port 27 leading through passage 27' to the left-hand end of secondary motor 11, and in which left hand port 19 of the primary motor 10 is open to fluid pressure supply through the conduit 22. The primary motor 10 is thereby operated to move piston rod 14 to the right and return the balancing devices 111 toward their normal position. As soon as this return movement commences, exhaust fluid from the right hand end of primary motor 10 is forced through right hand port 19, through right hand port 27 and through left hand passage 27' to the left hand end of secondary motor 11. The piston 13' and piston rod 14' are thereby moved to the right. This motion to the right is the same as the return motion of the piston rod 14 of the primary motor 10. The result is that through the common connection 15 and the cords 16—16', etc., the balancing devices 111 are subjected to the combined action of the primary and secondary motors in the same direction. They therefore return toward normal at a rate greater than that at which they were moved from normal. This increased movement of the balancing devices continues until the balancing devices have reached normal and have been moved past normal, thus setting up checking forces in the opposite direction, which checking forces meets the inertia of the craft as it comes rapidly into normal position and stop the craft precisely at its normal position.

When the craft is in its normal position, and there is a freedom from unbalancing conditions, the vanes 60—60' are in their normal position, and through the lever 74, the valve 17 of the primary motor is moved to occupy the central position as shown. In this position of the valve 17 and with the craft at normal, the piston 13 and piston rod 14 of the primary motor are always in the normal position shown. Therefore as the craft reaches its normal position and as piston 13 and rod 14 take their normal positions, the rod 51 of the lost motion device 50—51—52 is given a relatively great movement, returning the controlling valve 18 of the secondary motor 11 to its normal position in which the transfer of fluid from the right hand end of the primary motor 10 to the left of the secondary motor 11 is cut off through closure of ports 27—27'. As these ports are closed, the by-pass ports 29 are opened and such small amount of remaining exhaust fluid as may pass from primary motor 10 is forced through ports 29 and branch 30 in the return conduit 26 of the fluid supply system. This stops all movement of the secondary motor 11 as the motion of the primary motor 10 is stopped. During the return to normal movement of the valve 18 of the secondary motor, the by-pass valve 54 of the secondary motor is opened momentarily through the engagement of lever 55 with the left hand claw 57 in the left hand movement of the valve 18. An immediate return of the secondary motor to normal position and with it the balancing devices 111 is effected. The lever 55 by reason of its arc of movement becoming disengaged from the claw 57, the valve 54 is again closed in its central position by springs 59. The return to normal movement of piston 13' and the balancing devices 111 is augmented through the provision of springs 13" in opposite ends of the motor cylinder, or their equivalent. Thus the checking force is removed just as the craft comes to rest in its normal balanced position. With ailerons 111 of the type shown, the springs 13" are not of much utility, but with ailerons of what may be termed the balanced type having no bias to normal under wind pressure, the springs 13" may have all of the work of the return to normal to do.

Upon an unbalancing movement of the craft in the opposite direction, due to any cause which effects counterclockwise movement of the vanes 60—60', the operation of the mechanism just described is precisely reversed. The valve 17 is initially moved to the left instead of to the right, thus closing the left-hand port 27 instead of the right, leaving the right open as was previously the left for the exhaust of fluid by way of branch 29. The valve 18 in the initial right-hand movement of the rod 14 is set over to the left, thus opening up the left-hand port 27 to the port 27' of the right-hand end of the secondary motor 11. The previously described actions will follow in order.

Due to the fact that the standard of position governing this mechanism is subject initially to variations in wind pressure having an unbalancing effect, thus anticipating unbalancing of the craft with a corrective deflection of the balancing devices, and to the fact that upon the return of the craft to normal from such resulting unbalancing position as it may have taken, a checking force is set up through the primary and secondary motors 10—11 as just described, the balance of the craft is very accurately preserved, and at no time is the movement of the craft from normal and its return thereto excessive or severe. The craft does not move from its normal position with such a system of balancing to nearly such an extent as it moves under gravity control alone for the reason that through the pressure responsive vanes 60—60' there is an anticipation of the movement, which movement while it may be not altogether prevented is always held to a minimum.

At this point it should be noted that when the craft does become unbalanced and the greater mass of end 63 and weight 65 affect vanes 60—60', their movement continues only until the deflecting component of the weights which is proportional to the angle of unbalancing is counterbalanced by an increased wind pressure on the end 63 of the vane on the relatively low side. The wind pressure on the ends 63 of the vanes increases relatively when either vane is given a position approaching the transverse.

Simultaneously with the operation aforesaid, the mechanism 117 which is a duplicate of the mechanism 10—11, etc., is operated in response combinedly to variations in wind pressure on vane 105 and variations in the position of the craft from normal as determined by a gravity controlled standard 125, to operate the horizontal rudder 121 in a manner entirely similar to the manner in which the ailerons 111 are operated by the mechanism 10—11. While the ailerons thus operated maintain the lateral stability of the craft about a longitudinal axis, the horizontal rudder 121 operated by mechanism 117, maintains the longitudinal stability about a transverse axis. As respects the mechanism 117 and its connection to the horizontal rudder 121 a sufficient description has already been given to enable its operation to be clearly understood from the described operation of the mechanism 10—11. There is this to be noted however, that in general construction the mechanism 117 and its connections to the horizontal rudder 121 differ from mechanism 10—11 and its connections to ailerons 111, in the omission of cord connections 16—16', and the provision of a simple link 118 between the yoke lever 15 and the lever 119 of differential 119—120 which connects with the rudder 121. As is the case with ailerons 111 which are manually operable through lever 116 and differential 112—113, the horizontal rudder 121 is similarly manually operable through lever 124 and differential 119—120.

The difference of prime importance between the operation of the system directed particularly to the maintenance of lateral stability through the operations of ailerons 111 and that portion of the system directed to the maintenance of the longitudinal stability, is to be found in the government of the latter portion of the system through pressure responsive device 105 and gravity controlled standard 125 instead of through a set of vanes 60, 60'. This difference exists because of the difference in conditions to be met.

In the maintenance of lateral stability we are dealing with unbalancing caused principally by differences in lift moments of the right and left wings of the machine brought about by changes in velocity and directions of air rush, and with differences in lateral load distribution; whereas in longitudinal stability we deal with differences in lift moments as between the principal supporting surface and the tail of the machine, with changes in load distribution with respect to the center of lift, with changes in incidence, resulting shifts of the center of lift itself, with critical angles of lift, critical speeds, soaring conditions, etc. Obviously these conditions are not only greater in number, but different in kind.

Upon a sudden increase in wind pressure on the device 105, it is moved rearwardly carrying with it the lower end of lever 129 and through link 131 operating lever 174 counterclockwise, the bell crank 46 clockwise, and the valve 17 to the right of the diagram, thus effecting the movement of piston rod 14 to the left with a resulting movement of levers 119—120 to the left, thus raising the horizontal rudder 121 and pointing the craft upwardly. Exactly the reverse takes place upon a marked decrease in pressure, the horizontal rudder 121 being deflected downwardly. Due to the action of the follow-up lever 176 (and this action is the same for the mechanism 10—11 as for the mechanism 117 at present under consideration,) the rudder 121 is not moved to the full extremity upon each operation of the mechanism 117, lever 176 after a degree of movement depending upon the position of lever 174, moving that lever about its point of connection to link 131 to give the valve 17 its mid position whereupon operation of mechanism 117 ceases until there is further variation one way or the other of the governing devices 105 and 125. Its follow-up action is well understood and needs no detailed description herein. Thus it will be apparent that the climbing angle of the craft is regulated automatically in accordance with the wind pressure and since wind pressure depends directly upon the propelling power and speed of the craft the angle of climbing is likewise proportioned to the speed. When the speed is sufficiently great to warrant climbing at a greater angle, increased wind pressure upon device 105 operates the horizontal rudder 121 to point the craft upwardly. When the speed is too low for climbing, a decreased wind pressure on device 105 effects operation of horizontal rudder 121 to point the craft downwardly at a suitable angle for safe flight, and under conditions of extremely low speed at the proper angle for safe descent. An air craft climbs best when the climbing angle is adjusted to suit the particular speed at which the craft is traveling against the wind, and for each different speed the most efficient climbing angle is different. The adjustments to the different speeds are automatically and continuously taken care of by the governing action of the pressure responsive device 105.

At any time during this action of the device 105 should it not be desired to climb at the rate determined by the device 105, the rate of climbing can be decreased, or climbing stopped altogether either by lowering the speed through manual adjustment of the throttle lever 146 of the engine, or through the use of the manual control lever 140 connected with the follow-up lever 176. When the lever 140 is adjusted, it gives to lever 176 a new normal position as respects the device 105, and through the resulting operation of the rudder 121, gives the craft likewise a new normal position as respects the normal position of device 105. This, like the throttle movement alters the speed. Thus when it is desired to climb the maximum distance in the shortest time for a given speed, the lever 140 may not be disturbed, and the device 105 will automatically effect climbing at the very highest rate. At any time whatsoever however, through lever 140, the normal direction and rate of travel of the craft in the vertical plane may be adjusted by simply moving lever 140 to the desired position. Lever 140 and its connections, with follow-up lever 176, thus constitute a most efficient means for steering the craft through the power operated mechanism 117.

Should the power operated mechanism 117 become disabled due to any cause, the rudder 121 may be controlled directly through lever 124 which connects directly therewith through differential 119—120. There is no class of control left unprovided for. Should the pilot desire air rush control alone, he may lock out the earth's standard 125 by use of device 125ª, should he desire earth's positive control alone, he can lock out air rush control device 105 by device 249, and should he choose to exercise manual control alone, as in doing stunts or landing in an especially close place, he can eliminate all automatic control.

Since control lever 140 operates rudder 121 through the power operated mechanism 117, its position is always indicative of the angle of inclination of the craft to the horizontal, and of its angle of incidence and speed for a given power of its motor, while since lever 124 is connected directly to the rudder 121, its position (when the mechanism 117 is disabled) is indicative not of the position of the craft, but of the position of the rudder 121 itself at any instant. When the mechanism 117 is under control of standard 105, the manual control 124 may be used similarly to manual control 140.

The set of levers 80 and 116 associated with the mechanism 10—11 are provided for the same purpose as are levers 140 and 124. Through movement of lever 80, the ailerons 111 may be operated through mechanism 10—11 to alter the normal angle or lateral balance of the craft, while through lever 116 ailerons 111 may be operated in supplement to operation by the power driven mechanism 10—11 or independently thereof should that mechanism become disabled.

To return to the pressure responsive control device 105, not only is this device responsive to variations in the degree of wind pressure, but it is also responsive to variations in the direction of the wind by virtue of the angle of inclination of its surface. Thus it compensates for changes in lift and travel of center of pressure under varying angles of incidence. When the direction of the wind is upwardly, there follows a decrease of total resultant pressure on the surface of device 105, for when directed upwardly, the wind more closely parallels the plane of the surface 105. The result is that the surface 105 moves forwardly until its angle as respects the direction of the wind is normal. This forward movement results in downward movement of rudder 121 to point the craft downwardly against the unbalancing action of the upwardly directed wind pressure. Conversely, a downwardly directed wind pressure approaches the normal to the surface 105 instead of parallelism therewith, with the result that there is an increase of total pressure on surface 105 and the surface is moved rearwardly proportionally to the variation in the angular direction of the wind, causing pointing of the craft upwardly against the downwardly directed unbalancing pressure of the wind. The operation of the mechanism 117 under these conditions is the same as under preceding conditions of change in degree of wind pressure without change in direction.

Still further through device 105 the craft equipped with this system is adapted for soaring. Under conditions of prolonged alteration of the normal direction of the wind, the device 105 positions the craft properly for soaring thereupon. Thus assuming that the direction of the wind is upwardly as it should be for soaring flight, immediately the direction of the wind changes, the total pressure on surface 105 is decreased with the result that rudder 121 is moved to point the craft downwardly and more closely into parallelism with the direction of the wind. This downward movement continues until surface 105 is given its normal angular position with respect to direction of the wind. This normal angular position is attained when due to the combined movement of the surface 105 forwardly in response to a decrease of pressure, and the pointing of the craft downwardly, the pressure on surface 105 is increased and surface 105 is moved rearwardly as the craft continues to point downwardly, thus restoring rudder 121 approximately to its normal position, under which conditions the craft is pointed into the teeth of the upwardly directed wind in which case as is well known, the craft will move against the wind with less or without any propelling power depending upon the degree and direction of the wind. The reason for this is that the direction of the total force on the planes of the craft is forwardly of the vertical under these conditions and it has a substantial horizontal component. Obviously having positioned the craft for the soaring flight, the device 105 adjusts its position for each subsequent variation of the wind.

Through the thumb screw 109ª and the spring 107, the governing action of the device 105 may be adjusted under these conditions with great fineness. Also when atmospheric conditions are suitable for soaring flight at frequent intervals, it is best to cut out the gravity controlled standard of position 125 so that the pressure responsive device 105 may act independently thereof. In order that this may be accomplished, a lock 125ª is provided in the form of a bolt mounted to turn in fixed bearings 125ᵇ and provided with normally vertical arms 125ᶜ adapted when the bolt is turned to take a horizontal position in the plane of movement of the pendulum 125 and one on either side thereof.

Adjustment of the angle of incidence for soaring flight may also be had through lever 140 by moving it the desired degree as previously described in connection with steering in the vertical plane. Any alteration in the position of the lever 140 alters the angle of incidence of the craft with respect to the normal direction of the wind. Between the adjustment 107—109ª and the adjustment through lever 140, the position of the craft may be adjusted with the greatest accuracy.

Through their various interconnections as well as through the interaction previously described, the mechanisms 10—11 and 117, coöperate with each other to produce a number of important results in addition to those already specified. The first one of these to be mentioned is the automatic adjustment of the degree of manual direction of the craft from normal at any instant in accordance with variations in wind pressure. This is accomplished through the connection of the pressure responsive device 105 with the limit devices 102—132 associated respectively with the vertical rudder 82 and the horizontal rudder 121. The position of each of these devices 102 and 132 is varied exactly in accordance with the variation in wind pressure upon device 105. Upon increase of wind pressure on device 105 limit device 102 is rotated to interpose portions of decreased radius between the abutments 94 in the operating connections 83 to the vertical rudder 82. The result is that vertical rudder 82 may be moved through large angles to enable the craft to make short turns. This is as it should be for under high speed conditions very short turns may be made. On the other hand, during low speed conditions, when the wind pressure is comparatively low, short turns should not be attempted. Low wind pressure on device 105 results in the movement of limit device 102 to interpose portions of increased radius between stops 94 and 95 with the result that the angle of turn is decreased in proportion to the decrease in speed. For each speed, the limit device 102 is therefore adjusted to permit the maximum safe angle of turn.

The device 132, it will be noted, is of substantially uniform radius, but by virtue of its eccentric mounting, its position as respects stops 137—138 and 135—136 is varied, thus altering not the degree of movement of the horizontal rudder 121, but altering the range of movement thereof, defining by its position the position of the range of movement of the rudder 121. By following out the connections it will be noted that under conditions of increased wind pressure obtaining under high speed, the rudder 121 may be moved upwardly a considerable distance, thus permitting a sharp turn upwardly to be made, while under conditions of low pressure obtaining at low speeds, the rudder 121 may be pointed upwardly but a very small degree if any at all. Under conditions of the very lowest safe speeds, the position of the device 132 will be such as to prevent either lever 140 or lever 124 to be moved to a position to point the craft upwardly. At the same time they may be moved freely to direct the craft downwardly in any suitable volplane to earth. Either or both of these sets of stops 137—138 and 135—136 may be omitted if desired.

While the devices 102—132 are shown separately in the diagrams of Figs. 1ᴬ and 1ᴮ, as shown in Fig. 4, it is intended that they be mounted on a common spindle 103 and operated by a common connection 104 with the pressure responsive device 105. As shown in Figs. 4 and 5, the spindle 103 is mounted vertically on a rectangular frame 170 and provided with pulley 171 on its upper end. Abutments 94 and 95 are formed on the transversely extending bar 172 which overlies the device 102 and passes through slots in the ends of the frame 170. The opposite ends of the bar without the frame 170 are provided with eyelets 173 for the attachment of the operating cords 83 extending to the vertical rudder. Overlying device 132 are located bars 174 and 175 carrying respectively abutments 137—138 and 135—136, coöperating with device 132. This entire structure may be made of light sheet material as for instance sheet aluminum and will weigh but a few ounces. Since connections 83 to the vertical rudder and connections 123 to the horizontal rudder usually parallel each other as installed on a machine, it will be seen that the combination of these limiting devices in a single structure is a feature of marked economy.

Also combined with the limit devices 102 and 103 in the frame 170 is a locking device 96—97—98 operated from lost motion device 50—51—52 (see Fig. 1^A) of mechanism 10—11. This device comprises a shaft 98 substantially parallel to the bar 93 and provided with outwardly yielding abutments 96—97. Upon each initial movement of piston rod 14 and hence of the balancing devices 111 from their normal positions, the shaft 98 is rotated in one direction or the other to interpose either stop 97 in the path of the abutment 94 or stop 96 in the path of abutment 95. The interposition of these stops in this manner positively prevents movement of vertical rudder 82 to make a turn in a direction opposite to the then prevailing direction of unbalancing of the craft. The need for such provision is well known. Not only should the craft be upon an even keel when a turn is commenced, but it should more preferably be banked on the off side of the turn. This locking device insures the craft being upon an even keel before any turn can be commenced. Of course adjustment of the device may be made on one side or the other so that the turn may be commenced a little before or not until a little after the craft has reached its normal position, this being merely a matter of degree, the essential feature of my invention being that the craft must be brought substantially to an even keel before a turn may be commenced. If the skilled pilot desires it, the device 96, 97, 98 may be omitted.

Due to the provision of the inwardly yielding locks 96—97, should it happen that when the stops 96—97 are set, either one of the coöperating abutments 94 or 95 should be without the stops, the rudder may be moved until they pass over the stops into a position between them. Such a condition is possible when the vertical rudder is moved suddenly to make a short turn, the operation of the balancing mechanism 10—11 lagging slightly behind it. It is especially to be noted that the stops 96—97 are at 180° with each other, and that due to this only one of them is effective at a time. That one is the one which prevents turning in a direction away from the low side of the craft. Turning may be freely exercised in the direction of the low side.

It sometimes happens that turning away from the low side of the craft judiciously assists in restoring the balance of the craft.

It is contemplated that the automatic mechanism of my copending application Serial No. 660,249, shall be employed for this purpose, the vertical rudder 82 being moved automatically after the ailerons 111 have been moved to their full extent without initiating response of the craft. As in the application mentioned, connection with the vertical rudder 82 will be made through suitable differential gearing connections and of course this differential will be located in this system between the locking device 102 and the vertical rudder 82.

The connection 86—87—89 from steering post 84 to lever 79 is made for the purpose of initially banking the craft prior to making a turn. Between the connection 86 and the locking device 102 are provided the yielding connection 90 and the Geneva gearing, which not only permits movement of lever 79 to set the mechanism 10—11 to bring about the desired initial angle of bank, but also permits the steering post 84 to be moved to whatever position it is desired to give the rudder 82 irrespective of the then position of the stops 96—97. The steering post 84 being retained in its position, immediately the craft has turned substantially to normal and stops 96—97 have been returned to their normally disconnected positions, the spring 90 effects the desired movement of the rudder 82 by virtue of its potential energy. Thus the operator is not disturbed by sudden bringing up of the steering post due to the abutment of stop 96 or 97 with 94 or 95. The angle of bank having been previously determined through the prior operation of lever 79, the sudden movement of rudder 82 through the potential energy of spring 90 is all right.

When the pressure responsive device 105 moves, it also operates the block 162 (see Fig. 1^A) up and down in slot 163 to effect the amplitude of movement of the ailerons 111 in accordance with the wind pressure and hence with the speed of the craft. Obviously under high speeds a smaller amount of movement of the balancing devices is required to correct unbalancing, for under high speeds the corrective forces for a given angle of movement of the balancing devices are greater than at low speeds. The magnitude of the lateral disturbing forces are not determined so largely by the speed of the craft as by the power of the gust which strikes the machine and the corrective forces set up by the balancing devices 111 should therefore be maintained substantially constant. This is done through the connection of block 162 with the pressure responsive device 105.

A similar connection may be provided and is contemplated according to the present invention for the horizontal rudder 121. Since in operation and in result its action is identically the same as that shown in connection with ailerons 111, it is not deemed necessary to duplicate the showing.

Through connection 156 in extension of connection 104, block 157 carried by lever 87 is also moved back and forth by the pressure responsive device, thus altering the degree of movement of lever 79 and the initial angle of bank in accordance with variation in wind pressure. For low pressure obtaining during low speed, a high angle of bank is unsafe and even unnecessary, while for high pressure obtaining during high speed, a high angle of bank is both safe and necessary. This feature of the system is not important in all cases and may be used or not as desired. The device 102 controlling the degree of turn of course incidentally controls the degree of bank.

Through the connection of device 105 with lever 151 of differential connections 149—150—151, the throttle is opened and closed in accordance with variations in wind pressure. Thus under disturbing atmospheric conditions, the speed is increased or decreased as may be most desirable to force or retard the craft in its movement through the disturbed space. Through variations in the lengths of the lever connections to the throttle 142, the degree of such variation may be made as small or large as desired. As now connected, the throttle is automatically opened more widely under conditions of low pressure and automatically partially closed under conditions of high wind pressure. The degree of such opening and closing is of course small as respects the full movement of the throttle. The propelling power is varied accordingly.

The vertical steering post 84 also has connection through differential 149—150 with the throttle 142. When the post 85 is moved to the right or to the left to initiate a turn, the throttle is opened slightly to increase the propelling power and give increased stability due to increased speed in making the turn. The speed of air craft always falls away during balancing operations, and due to the falling away of the speed and the consequent decrease in efficiency of the balancing devices and steering rudders, the preservation of the balance is rendered more difficult. Through this variation of the propelling power in accordance with a function of the degree of movement from normal, the speed of the craft is maintained substantially uniform despite the unbalancing movements and during the most rapid succession of turns.

Through connection of control lever 140 with differential 149—150—151, the throttle is opened when lever 140 is moved to steer the craft upwardly and closed when lever 140 is moved to steer the craft downwardly. The degree of this movement is preferably made much greater than the degree of movement pertaining during movement of pressure responsive device 105 and vertical rudder 82 through post 84, for the reason that when volplaning no power at all is required after a certain angle of downward inclination has been reached. As in case of operation from the pressure device 105 and from the rudder 82, however, the degree of operation of the throttle 142 and hence of the change in the propelling power, is proportional at all times to a function of the movement of control lever 140.

Such is the present embodiment of the system of my invention. Under this system, due to the government combinedly by variations in wind pressure or air rush and variations in the position of the craft from normal with respect to the earth, and due to the interrelation of the operation of the various elements of the system with the pressure responsive device and with each other, the degree of unbalancing under disturbing forces is comparatively small, and while response is rapid, positive and accurate, it is yet gentle and easy. With this system installed, an air craft can be operated by a mere novice with practically no prior training. While the automatic mechanisms operate, due to the interlocking and limiting devices, it is impossible for one to make unsafe control movements or to get the craft into unsafe positions. The balancing rudders are moved always precisely the proper amounts and are retained in their operated positions for a length of time exactly that necessary to establish the corrective movement of the craft. The craft is also checked at normal automatically. The action of the automatic devices is far more accurate than the best judgment of the most experienced aviator. The aviator cannot make dangerous turns under adverse conditions of unbalancing and speed. He cannot jam the control mechanisms in his attempts to make such turns. He cannot point his craft either upwardly or downwardly at too great angles, and it is thus impossible for him either to stall his machine or to get it pointed downwardly so far that its recovery from the approach to the vertical position is impossible. Nor is it possible for him to point the craft upwardly after automatic action has set the craft for safe descent on failure of power or other below normal pressure conditions. During all these operations the speed of actuation of the balancing devices, the amplitude of movement thereof, and the initial angle of bank are automatically adjusted precisely to the right value to meet the conditions existing at any instant. Also automatically a far more efficient use of propelling power is had, the propelling power not only being automatically cut off when volplaning, but adjusted to suit the demands at any instant, being progressively varied when soaring flight sets in and at all times subject to complete removal by manual operation of the aviator. And throughout the system, upon disablement of any part thereof, manual control may be resorted to at will.

Finally since the pressure responsive devices 60, 60' and 105 are extremely light and of small mass, they move with the rapidity of the wind itself, with the result that the celerity of the actuation of the balancing devices and of the other interdependent elements of the system surpasses incomparably any means of manual control at present known to the art.

It is obvious that the system of my invention may be given many forms other than that herein disclosed without departing in any way from its generic spirit. The reason for this is found in two facts, the first of which is that the method of operation and control of an air craft as exemplified in the use of the system I have disclosed, is broadly new in each of several respects which will be pointed out in detail in the annexed claims. The second fact is found in the well known versatility in the engineering profession in the production of a given device or system of devices in any one of a number of ways without departing in any wise from the generic spirit of coöperation of the elements thereof. I likewise desire to cover in the annexed claims all embodiments of my invention which may fall within these limits.

It is obvious that my system may be used in part or in whole, it being quite feasible to omit one or many parts of the system without interfering with the performance of the functions of the other parts, though of course the advantages gained through the combination and interoperation of the parts omitted with the parts retained will be lost. Thus for instance it is possible to omit altogether the longitudinal balancing mechanism 117, yet retaining the pressure responsive device 105 and its interconnections with the elements of the lateral balancing mechanism 10—11. So also it is quite practicable to omit the connection of any element of the system to pressure responsive device 105 without impairing the functions of the remaining elements connected thereto. Thus connection to lever 151 and the throttle 142 might be omitted in certain cases, the then free end of lever 151 being secured pivotally in any suitable manner. So also for example the connection of device 105 to the block 157 on lever 87 may be omitted without impairing the functions of the remaining connections, and so on throughout the system.

Furthermore as far as the system per se is concerned, it is possible for the versatile engineer to substitute for one element of the system of my invention another element of the same type already known to the art without departing from the spirit of my invention, or changing the functioning of the element for which substitution is made. Thus as far as the rest of the system is concerned, a different form of pressure vane 60—60' may be used. One such form is shown in Fig. 3 herewith. The vanes 60—60'ᵃ of Fig. 3 differ from the vanes 60—60' of Fig. 2 and Fig. 1ᴬ in that the inclination of the opposite ends 62 and 63 is the same on opposite sides of the axis 61. Thus the wind pressure exerts a lifting force on the entire length of the vane. As before however the end 63 is of greater area and weight than the end 62 and hence the overbalancing wind pressure is on the end 63. Also the vanes of Fig. 2 are mounted on outriggers 175' entirely free from the horizontal projection of the main planes 176 of the craft whereby upwardly and downwardly directed pressures may act freely upon both ends of the vane, while in the case of the type shown in Fig. 3, the axis 61 is on the outer edges of the planes 176 whereby the inner ends 62 of the vanes 60ᵃ and 60'ᵃ are within the horizontal projection on the planes. The effect of this is to secure more efficient action under upwardly and downwardly directed wind pressures, the end 62 being shielded from such wind pressures and thus does not act in opposition under such conditions to the end 63.

So also a parabolically curved lifting surface 108 may be substituted for pressure responsive device 105 as previously described, and with the same results when incorporated in the system. As far as the system is concerned, the pressure responsive devices illustrated must be taken as illustrative of a type.

When pressure responsive devices are departed from, it is readily apparent indeed that any gravity controlled or gyroscopic standard of position may be used in lieu of the pressure responsive device in the same manner as the same are used widely today. The great advantages of the pressure responsive control will be lost, of course, but the system will not be rendered inoperative. The essential difference will lie in the fact that there will be no anticipation of unbalancing and no advance correction, correction taking place only upon unbalancing movement of the craft.

As regards the power operated mechanism 10—11 and 117, obviously primary and secondary motors may be combined with the results herein attained in a number of ways. The valve mechanism between the primary and secondary motors 10 and 11 may take a variety of forms. The valve 17 as shown is not a balanced valve, but a balanced valve may be used if desired. In the present instance this valve being power operated, balance is not required. Any desired means for holding the valve in its operating positions may be used as for instance the means disclosed in my copending application Serial No. 641,662.

It is apparent that there is considerable load on the pressure responsive device 105 and my invention contemplates making this device of sufficient size to carry the load or else using a simple form of relay between the device 105 and the several elements of the system governed by it. The provision of such a relay would not amount to invention, being a well known expedient not only in this art but in most of the mechanical and electrical arts. There would further not be invention involved in splitting up the load and in using two pressure responsive devices 105, one connected with some of the elements and the other with the remainder.

A common form of relay connections is shown in Figs. 6 and 7 which show the pressure responsive device 105 and the standard of position 125 connected to operate electrical contacts 177, 178 to close electric circuits 179, 180 to oppositely acting magnets 181—182 which are provided with an oscillatable normally centralized armature 183 connected by link 184 with the lever 74 of the balancing mechanism, or any other suitable part thereof. The pendulum 125 is pivoted on fixed point 185 and the pressure responsive device 105 is pivoted at a fixed point 186 and connects by rod 187 carried in fixed abutments 188 with contacts 177 and 178.

In Fig. 7 the pendulum 125 is shown inclosed in a wind-proof casing 189 which is opened only at the bottom as at 190. Separate sets of contacts are used in this modification, one set 191 being individual to the pendulum and carried by the pendulum rod and casing respectively, and the other set 192 being individual to the pressure responsive device 105 and mounted the middle contact on a fixed support and the movable contacts on a rod 187 carried on abutments 188 as in Fig. 6. The sets of contacts 191 and 192 are in parallel with each other and control jointly the circuits 179—180 of the the magnets 181—182. Any suitable connection of the pivot 185 of the pendulum and the normally fixed contact 192ª may be made with a follow-up device as for instance lever 76 of the mechanism 10—11 (see Fig. 1ᴬ). Such connections to follow-up devices are quite common in the prior art.

In Fig. 1ᴮ is shown a pendulum 193 or an equivalent device connected with the manual operating cord for the throttle of the driving motor, together with a cut-out device 219ª which may be used to lock the pendulum and the manual control in fixed position. When free from both the locking device 219ª and the manual control, the pendulum will operate the throttle to vary the propelling power in accordance with the position of the craft, decreasing it when the craft is on the descent and increasing it when the craft is on the ascent. This is particularly valuable in soaring flight. At any time manual control may be exercised through the foot lever, the power supplied to the foot lever overcoming the force exerted by the pendulum or other standard of position.

In connection with the cord 133 leading from the pressure responsive device 105 is shown a locking lever 249, which lever is normally free to be oscillated by the cord 133 in its movement. When it is desired to lock the pressure responsive device from action however, the link 251 may be raised from the upper end of the latch 250 which coöperates with rack 248, whereupon the lever 249 may be locked in any desired position (preferably the normal position defining the normal position of device 105) by the engagement of the latch 250 with the rack 248. It is apparent that the link 251 normally retains the latch 250 in raised position.

As has been stated, my invention is applicable to the control of air craft through the directly acting or simple balancing mechanisms as well as through the power operated mechanisms previously described. Such embodiments of my invention are shown in Figs. 8 and 9 of which Fig. 8 will be first described. The details of these embodiments are claimed in my copending application S. N. 436, 410, filed Jan. 11th, 1921, as a division of this application.

The balancing devices shown in Fig. 8 are of the type shown in my copending application Serial No. 715, 275, filed August 15th, 1912. They comprise lifting vanes 200 mounted substantially in the horizontal plane, or at any slight angle thereto which may be desirable from the standpoint of advantages obtained through the use of dihedral angle or other well known principles. They are fixed to freely rotatable vertically extending axes 201 mounted in anti-friction bearings at the opposite lateral extremities of the craft. They are oblique in the direction of their length to the longitudinal axis of the craft, their lengths converging to a point in advance of the transverse line connecting them. Their outermost ends measured from the axis 201 are longer than the innermost ends, whereby the head resistance or wind pressure on the outermost ends is greater than that on the innermost ends, and whereby the controlling torque brought about by the wind pressure is in opposite directions on the opposite vanes. This may be brought about in any other suitable manner as for instance by the addition of surfaces 204 fixed to the axis on the outboard side in each case.

These vanes are connected together for retention in their normal angular relation as respects each other, and for movement about their axis in unison, by cords 202 connecting longitudinal cross bars 203 secured to the rotatable axis 201.

For a detailed description of the action of these vanes under unbalancing conditions, reference may be made to the copending application above referred to. For the purpose herein suffice it to say that when it is desired to bank the craft, movement of the vanes 200 is brought about in a clockwise or anticlockwise direction depending upon the direction of the turn it is desired to make through the operation of the vertical rudder 82 of the craft. In the application aforementioned, this movement of the vanes 200 to bank the craft was brought about through a variation of the connections between the vanes. In Fig. 8 it is brought about by changing the relative angle of obliquity of the auxiliary outboard surfaces 204. For this purpose the surfaces 204 are mounted on horizontally extending axes 203ª revoluble in bearings fixed to and rotating with the axes 201, whereby while the axes 203ª are revoluble, they are nevertheless fixed radially with respect to the axes 201 and vanes 200. The normal angle of obliquity of the surfaces 204 is preferably 30° or 40° and in the same direction forwardly whereby there is exerted a lifting effect upon them. Through cord connections 205 with pulleys 206 on shaft 203ª, the connection being made by way of blocks 207 closely adjacent to the axes 201, the surfaces 204 may be freely moved simultaneously in opposite directions, without there being exerted through the cords 205 any torque or restraining force upon axes 201. When the vanes 204 are so moved, that one whose obliquity is increased has greatest wind pressure exerted upon it in the line of flight, and that one whose angle of obliquity is decreased has a less wind pressure exerted upon it. The result is that through this difference of pressure, the vanes 200 are rotated about their axes until an equalization of the resultant pressure about the axes on opposite sides of the craft takes place. This is brought about through the increase of pressure on the long end of that vane 200 which is rotated to a position closer to the transverse axis of the craft, as will be well understood, the vane 200 in this position having a greater head resistance and secondly having a greater torque exerted upon it on the outboard side. This will be readily understood from what has previously been said about the vanes 60 of Fig. 1ᴬ.

The horizontal rudder 121 shown is of the same type as that shown in connection with Figs. 1ᴬ and 1ᴮ, while the pressure responsive device 108 and the vertical rudder 82 are of the type shown in Fig. 3.

The pressure responsive device 108 operates the horizontal rudder 121 automatically through cords 208. These cords connect with rudder 121 through differential 209—210 and cords 211. A manual operating lever 213 also connects with the horizontal rudder through differential 209—210, connection being made by cords 212. Cords 212 connect with arm 214 of the throttle lever 216. Connected with the opposite end of arm 214 is cord 217 secured to foot lever 218 whereby the throttle may be manually controlled. Intermediate lever 215 connects at one point with lever 214 at its middle directly with throttle lever 216 and at the other end with standard of position 219 connected with fixed part 220, whereby the throttle is operated to vary the supply of power in accordance with the position of the craft.

Vertical rudder 82 is operated through cords 221 to which are connected cords 205 for operating the controlling surfaces 204 of the vanes 200, whereby when the vertical rudder 82 is moved to make a turn, the surfaces 204 are operated in the proper direction to rotate the vanes 200 to properly bank the craft. Manual operation of the vertical rudder 82 is effected through differential 222—223 connecting by cords 224 with manual operating lever 225. The locking device 96—97—98—99 of Fig. 1ᴬ is connected with cords 202 of the balancing devices 200. The interlocking member 227 is connected directly in cords 221. The abutments 96 and 97 are rotated into the path of movement of the abutments on member 227 whenever the balance of the craft is not such as to warrant a turn in the direction desired. The lost motion connection 50—51 of Fig. 1ᴬ has not been shown but it is undersoood that it will be included in the connection of the cords 202 with pulley 99. The operation of this device has been fully explained in connection with Fig. 1ᴬ.

Connected with differential 222—223 is an operating cord 228 through which vertical rudder 82 may also be operated. This cord is operated from a pulley on rotatable shaft 229 having at its lower end a hub 231 having a sliding connection with the trunk of a T-shaped member 230, the transverse part of which is slotted. Within this slot slides a block 233 having sliding connection between abutments 234—235 with cord 208 connected with pressure responsive device 108. Springs 232 at opposite ends of member 230 retain it and the shaft 229 in a central normal position. A fork on the lower end of lever 236 pivoted to fixed point 237, straddles a block 233. The upper end of lever 236 passes through a block 238 pivotally connected with lever 225 and constitutes a lost motion device. The distance of the fixed point 237 from the block 238 may be made as small or as great as desired, thus introducing a greater or less degree of lost motion between the lever 225 and the lever 236.

As long as the craft is moving straight ahead, the variations of pressure on the device 108 cause it to operate cords 208 and automatically govern the longitudinal balance of the craft through connections with the horizontal rudder 121. During this time the member 230 is moved back and forth against the pressure of the springs 232 (which is far less than the controlling force of device 108) without affecting the normal position of the shaft 229. Also the amount of lost motion between block 233 and abutments 234—235 is such that unless pressure conditions are abnormal, abutments 234 and 235 do not engage the block 233. When however lever 225 is moved to make a turn, the block 233 is moved to one end or the other of the slot in member 230, this by the first operation of movement of the lever 225. Thereafter as is well understood, the block 238 simply slides upon the upper end of the lever 236 without producing any appreciable movement thereof. Thus block 233 is placed in one end or the other of the slot in member 230 in accordance with the direction of the turn contemplated. Thereafter should the speed of the craft fall, or should the wind pressure on device 108 be reduced for any reason whatsoever, the engagement of abutment 234 with block 233 under these conditions, will rotate shaft 229 and through its operation of vertical rudder 82, reduce the angle of turn to the safe value under existing conditions. Under conditions of extremely reduced pressure in which no turn at all would be warranted, the extreme movement of device 108 might entirely nullify the action of rudder 82. The degree of effect of the device 108 upon the rudder 82 may of course be made anything desired by the simplest imaginable proportioning of the intermediate connections.

The value of this differential interlock between the pressure responsive device 108, the manual control lever 225 and the vertical rudder 82 lies not only in the fact that dangerous turns under adverse conditions of speed and pressure are prevented as in the case of the system of Figs. 1$^A$ and 1$^B$, but also and perhaps more greatly in the fact that the angle of turn once commenced, will be reduced should conditions after the turn is commenced make its continuance at the same angle dangerous. It is a well known fact that several fatal accidents have occurred through the making of a sharp turn at substantially right angles to the direction of the wind. This has usually happened when the craft was going against the wind and its actual speed was comparatively low. Upon turning at substantially right angles to the direction of the wind at that low velocity, the sustaining force has been inadequate to maintain the craft under control or to sustain it in the air at all. With the system of my invention as shown in Fig. 8, immediately that the pressure on device 108 begins to fall, as it assuredly will as soon as the turn is commenced under the described conditions, the angle of the turn is decreased proportionately, and although the aviator may maintain manual control through lever 225 in its extreme position, the craft is positively prevented from taking a turn sharper than is warranted at any instant by the then existing conditions. A study of the operation of this interlock will show that its effect is not sudden and irregular, but is easy though quick as are the variations in pressure on the device 108. The aviator is thus not disturbed through the automatic action of this interlock.

I have herein shown also the positive stop interlocks 102 and 132 of Figs. 1$^A$ and 1$^B$, associated respectively with rudders 82 and 121. The device 102 may be entirely omitted if desired when the device 230 is incorporated. The device 230 is not subject to the objection that an aviator may find with the device 102 in that the device 102 is a positive stop and is liable to disturb manual operation to a slight extent until one becomes used to it.

The pressure responsive device 108 which is of the form shown in Fig. 3, is biased against wind pressure through springs 240 on rods 239 pivotally connected at one end to the device 108 and passing through apertures in the outriggers or other fixed part of the craft. The upper ends of the rods 239 are headed over or provided with nuts to confine springs 241 on the rod between heads 239 and forks 242 on a transverse shaft 243 mounted in suitable bearings. This shaft is rotatable through the gear and worm 244 and 245 from longitudinally extending shaft 246 provided with manually operable hand wheel 247. By altering the position of the forks 242, the pressure of springs 241 is altered and the resultant pressure of springs 240 is therefore altered without in any way affecting the freedom of movement of device 108. Thus the normal balancing angle of the craft may be freely altered by the aviator from his seat without in any wise interfering with the balancing functions of device 108.

The cut-out for the pressure responsive device 108 in the form of lever 249 connected with cord 208, is provided as in the case of the system of Figs. 1$^A$ and 1$^B$.

Referring now to Fig. 9, similar devices and similar parts have been similarly numbered. The embodiment of Fig. 9 differs from that of Fig. 8 principally in the character of the interlocks between the pressure responsive device 108, and the horizontal and vertical rudders 121 and 82. Instead of providing positive stop interlocks of the type of Figs. 1^A and 1^B (the interlocks 102—132), these interlocks are entirely omitted and interlocks functioning as does the device 230 of Fig. 8 are substituted. The form of these interlocks however is decidedly different from that of Fig. 8. In the system of Fig. 9 they consist respectively of links 252—253, pivoted link 253 at its middle, and link 252 at one end as shown by larger dotted line circle to fixed parts 254 and 255. These links are respectively oscillatable about their pivots by connection with the cords 208 between the pressure responsive device 108 and the horizontal rudder 121. Obviously the positions of the links are indicative of the speed and pressure conditions as measured by the device 108.

Connected at one end with link 252 by means of any suitable slide in the slot thereof is lever 256 having connections at an intermediate point with manual operating cords 212 for the horizontal rudder 121, and having connection at its opposite end with cords 260 connected with manual operating lever 213. As shown in the normal position of the lever 256, its connection with the slot in link 252 lies directly over the pivotal point of link 252 with the fixed part 254. By means of the link connection 257—257^a of this end of the lever 256 to link 258 on control lever 213, the lever 256 is shifted longitudinally of the link 252 to carry its point of connection thereto away from the pivot toward one end of the slot whenever the control lever 213 is moved. For the purposes of clarity, the link 252, the lever 256 and the link 257 have been shown at an angle to each other. This is the relative position they would occupy under abnormal conditions of pressure and speed of device 108 when the control lever 213 was moved. But under normal conditions of flight, it is to be understood that the link 252 and the lever 256 are substantially parallel, and likewise at substantially right angles to the connections 208, 212 and 260. These connections are laterally freely flexible and of such length as to permit such lateral movement without substantial lost motion in the cables.

Under these normal conditions whenever control lever 213 is moved, the lever 256 is moved longitudinally and its pivotal connection with link 252 shifted toward one end of the slot. The link 252 being substantially parallel with it however, it exerts no appreciable effect upon its angular position. Through connection 260 however the angular position of lever 256 is altered to move the horizontal rudder 121 to the desired position, and under such conditions, the movement of the rudder 121 is approximately proportional to the movement of the control lever 213. When the pressure and speed conditions are abnormal, however, the angularity of the link 252 is changed with respect to link 256. As long as the control lever 213 is in normal position however and the craft is proceeding in a straight line, this is without effect, for the point of connection of lever 256 to link 252 lies on the pivot of link 252 to fixed part 254. When ascent or descent is attempted under these conditions however, the point of connection of lever 256 is shifted toward the end of the slot in 252 as described with the result that the intended movement of rudder 121 is either augmented or decreased in accordance with the existing conditions. Thus to take a specific case, when the speed is high, the pressure on device 108 operates a cord 208 in the direction of the arrow and carries link 252 counterclockwise as shown. Then when control lever 213 is moved clockwise to deflect rudder 121 upwardly through connections 212, 209, 210 and 211, the movement of cord 212 and hence of rudder 121 is augmented through the clockwise movement of the upper end of lever 256. Thus an increased angle of ascent is permissible as is warranted by the existing high pressure conditions. Under low pressure and speed conditions, clockwise movement of link 252 would take place, with the result that the upper end of lever 256 would be moved counterclockwise in a direction opposite clockwise movement of lower end, and the movement of rudder 121 to turn the craft upwardly is decreased, and under extreme conditions may be nullified altogether, the lever 256 under such extreme conditions moving as it were about its point of connection to cord 212 as a pivot. The same functioning takes place when the lever 213 is moved counterclockwise to turn the craft downwardly, the point of connection of lever 256 being moved to the lower end of the slot in link 252 as before but with opposite effects.

Thus it is apparent that this differential interlock automatically and instantaneously at all times adjusts the resultant movement of the horizontal rudder to suit the pressure and speed conditions under which the craft is traveling. By suitable proportionment of parts this adjustment may be made such as to remove the control of the craft as far as may be desired from the danger points under adverse conditions. It is thus impossible for an aviator to take such an angle of ascent as to stall his craft or to take such an angle of descent as to plunge it beyond control. Moreover should the control lever 213 be moved to operate the rudder 121 at any instant when pressure conditions do not justify its operation, and that operation is reduced or annulled through the interlock 252—256, if the control lever is momentarily held in its position, the desired movement of the rudder takes place automatically at the instant pressure and speed conditions warrant it, for ensuing movement of the link 252 operates lever 256 to impart the requisite motion to operating cords 212. This is of extreme value when operating in variable or gusty winds, the effect of which can be gaged by an aviator only with extreme difficulty.

Associated with the link 253 is the control mechanism for the vertical rudder 82. A lever 261, the lower end of which is pivoted slidably and normally centrally of the slot in link 253, is connected at its middle to operating cord 221 which connects with vertical rudder 82 through differential 274—275. The upper end of this lever is connected by cords 265 with bell crank 264 associated with control lever 225. Lever 261 like the lever 256 is normally substantially parallel to link 253 and substantially at right angles to cords 208 and 221. Its lower end is connected by link 262 with the arm 263 of the bell crank 264. The bell crank 264 is connected by the oppositely disposed arms of the spring 266 attached to it, to the operating lever 225 which is independently movable.

Also associated with control lever 225 is the banking connection comprising block 267 pivoted or swiveled to lever 225, pin 268 passing through the block and connected with pulley 269 journaled independently of lever 225 on fixed part 270, and connected by cord 271 with one arm of differential 272—273 connecting with operating cords 205 which extend to the outboard rear extremities of the vanes 200. These extremities of the vanes 200 are made flexible so that they may be warped up or down simultaneously in opposite directions to alter the head resistance and hence the relative torques of the vanes 200 about their axes. The opposite end of the lever 272 of differential 272—273 is connected to control cable 221 leading to the vertical rudder 82 as aforesaid.

The interconnecting cables 202 between the vanes 200 are also connected to operate the vertical rudder 82 by means of cables 277 connecting with the arm 274 of differential 274—275.

The interlock between the vertical rudder 82 and the lateral balancing vanes 200 is provided in this case between the cables 202 and the cable 265 connected with the bell crank 264. A lost motion device of the block and pin type is clearly shown in this connection and it is numbered 50—51. For the details of this connection reference may be made to Fig. 1. The rotated abutment 96—97 coöperates with abutment 227 carried by the cord 265.

The operation is as follows: As long as pressure and speed conditions are such as to warrant turns of any desired degree, right or left, substantially the entire movement of control lever 225 is imparted to vertical rudder 82. At any instant however if the pressure and speed conditions are not such as will warrant the desired turn, the shifting of the lever 261 longitudinally of the slot in link 253 which occurs for each movement of lever 225, decreases to a greater or less degree the resulting movement of the vertical rudder 82 and hence the degree of the resulting turn. Should the craft be traveling at too slow a speed in a straight line to warrant an abrupt turn, such turn cannot be made either to right or to left, and under extreme imaginable conditions, it may be impossible to make such a turn at all. If however the operator desires to take the risk, he can cut out the pressure responsive device 108 by locking the same by the use of lever 249. But unless he deliberately chooses to take chances, he is automatically guarded against danger.

Also in making a sharp turn at substantially right angles to the wind, the progressive falling off of the sustaining force as the turn is made effects proportional movement of link 253, with the result that the angle of turn is decreased until the craft gains headway, whereupon and simultaneously the rudder is returned to the point necessary to complete the turn. The operator has only to move the control lever 225 to the position he desires and hold it there, and the craft will take the turn desired at the maximum safe rate.

It is to be observed that initial movement of the control lever 225 effects through lost motion device 267—268 flexing of the outer ends of vanes 200, with the result that the craft is given an initial angle of bank just as in the form of Fig. 1A. A tracing of the connections will show that the effect of flexing the vanes 200 is the same as changing the angle of obliquity of the auxiliary surfaces 204 of Fig. 8. Subsequent to this, the angle of bank is increased in proportion to the increase in the degree of the turn by means of the connection of cable 221 with differential 272—273. The combined action of gravity and the equalization of the pressures on the vanes 200 after the bank is entered upon, acts to limit the angle of bank to a definite value for each angle of turn as described in my co-pending application Serial No. 715.275 referred to. Adjustable masses and surfaces connected with the axes 201 are not shown but they may be used if desired as shown in Figs. 1A and 2 herein and also in the application referred to.

If the craft happens to be unbalanced in a direction opposite to that in which it is desired to make a turn the interlock 96—97—227 prevents movement of cable 265 to operate vertical rudder 82 until the balance is restored to a predetermined point, which may be at normal, or on one side or the other of normal as choice may decide. Under such conditions, the yielding connection 266 between lever 225 and bell crank 264 prevents springing or breaking of parts upon sudden and improper movements of control lever 225 under these conditions. In fact lever 225 may be moved against the tension of spring 266 to institute the turn, and as soon as the balance is restored to a point warranting the turn, cable 265 and bell crank 264 are released, and under the tension of spring 266 are moved automatically to operate the rudder 82 to the desired point. The initial movement of control lever 225 under these conditions preliminarily operates cable 271 to flex the vanes 200 to bring about the initial angle of bank. This action facilitates the restoration of balance, through the resulting increase in corrective forces exerted by the vane 200 on the lower side and corresponding decrease of lifting force of vane 200 on the high side. These operations are substantially as in the system of Figs. 1<sup>A</sup> and 1<sup>B</sup>.

If desired, the form of the differential interlock between pressure responsive device 108 and horizontal rudder 121 may be made the same as that between device 108 and vertical rudder 82. In such case, the link 252 will be centrally pivoted instead of pivoted at one end, and connection made with lever 213 by means of connection of link 257 with a suitable bell crank connected with the lever. In such case however, the differential action of the link 252 will be the same whether rudder 121 is turned up or down, just as in case of vertical rudder 82, the effect is the same whether rudder 82 is turned to right or to left. In other words if the effect of device 108 augments the movement of the rudder in one direction at any instant, it will at the same instant should movement of the rudder be in the opposite direction similarly augment that movement. The construction illustrated however is preferred.

Through the connection 277, to the vertical rudder 82, the rudder serves as a tail vane, steadying the action of the balancing vanes 200.

A plurality of balancing vanes 200 may be connected in multiple to transverse cables 202 as indicated clearly by the additional axes 201<sup>a</sup> beyond the axes 201. The vanes 200 on these additional axes 201<sup>a</sup> may be mounted in the same plane or in different planes from the vanes 200, but the essential feature is that their movement about the axes takes place in unison. The advantage of the multiple number of balancing vanes 200 as distinguished from a single very large vane on each side of the craft is that the moment of inertia is much smaller, whereby the action is faster. Of course the outer ends of these additional vanes 200 may be arranged to be flexed as are the ends of those vanes 200 illustrated. Or else additional surfaces 204 may be used in connection with axes 201<sup>a</sup>.

Fig. 10 illustrates the action of the motor devices 10—11 of Fig. 1<sup>a</sup> in setting up the checking force which checks the craft at normal position. The full line curve *a* represents the excursion of the craft during unbalancing, abscissæ representing time and ordinates representing the degree of unbalancing. The dotted line curve *b′* represents the simultaneous excursion of the balancing devices 111 or 121. Upon departure from normal and until maximum unbalancing is reached, the corrective force (substantially proportional to the degree of movement of the balancing devices) is proportional to the degree of unbalancing. When return to normal is commenced, however, operation of the secondary motor 11 having taken place, the balancing rudders 111 return to normal at a greater rate than the craft. The result is as clearly shown in Fig. 10 that the balancing devices reach normal before the craft reaches normal. Curve *b′* crosses the horizontal line before the curve *a*. Just as the craft reaches its normal position however, the balancing devices, having set up the checking force in the opposite direction and having stopped the craft precisely at normal, are suddenly returned to normal position as indicated by the dotted line below the horizontal and normal thereto. This is the action of the mechanisms 10—11 and 117 disclosed herein.

If desired to facilitate soaring flight, the connection of the pressure responsive device 105 to the throttle 142 may be reversed, so that upon decrease of pressure the throttle is closed proportionately, and upon increase of pressure the throttle is opened. This is not however so advantageous to quick recovery from unbalancing as is the arrangement previously described. With the arrangement previously described, the standard of position 193 alone will automatically cut off the power proportionately to the degree of soaring flight entered upon by the craft. Or else these automatic controls may be supplemented by hand control if desired.

I claim—

1. In an air craft a balancing system comprising balancing devices for correcting balance about one axis of the craft, a primary motor and control means therefor operating through said balancing devices to set up corrective forces when the craft moves from normal position as respects said axis, and a coöperating secondary motor and control means therefor also operating through said balancing devices to set up checking forces to check the craft at normal as it returns thereto.

2. In an air craft, a balancing system comprising balancing devices for correcting balance about one axis of the craft, a primary motor and control means therefor operating through said balancing devices to set up corrective forces when the craft moves from normal position as respects said axis, and a coöperating secondary motor controlled by the primary motor and operating through said balancing devices to check the craft at normal as it returns thereto.

3. In an air craft a balancing system comprising balancing devices for correcting balance about one axis of the craft, a primary motor and control means therefor operating through said balancing devices to set up corrective forces when the craft moves from normal position as respects said axis, and a coöperating secondary motor and control means therefor also operating through said balancing devices to set up checking forces to check the craft at normal as it returns thereto, together with means to supply the exhaust from the primary motor to operate the secondary motor.

4. In an air craft a balancing system comprising balancing devices for correcting balance about one axis of the craft, a primary motor and control means therefor operating through said balancing devices to set up corrective forces when the craft moves from normal position as respects said axis, and a coöperating secondary motor and control means therefor also operating through said balancing devices to set up checking forces to check the craft at normal as it returns thereto, together with connections between the motors proportionally correlating the movements of the seconary motor to the movements of the primary motor.

5. In an air craft a balancing system comprising balancing devices for correcting balance about one axis of the craft, a primary motor and control means therefor operating through said balancing devices to set up corrective forces when the craft moves from normal position as respects said axis, and a secondary motor and control means therefor having its movements permanently and proportionally correlated to the movement of the primary motor and thereby operating through said balancing devices to set up checking forces to check the craft at normal as it returns thereto.

6. In an air craft, a balancing system comprising balancing devices for correcting the balance about one axis of the craft a primary motor for operating the same, a motor controller therefor, a standard of position governing said motor controller, a secondary motor also operating said balancing devices, a second motor controller therefor set in operation by the initial movement of the primary motor to determine the direction of operation of the secondary motor, and additional means subject to the return toward normal movement of the primary motor to initiate movement of the secondary motor in the predetermined direction.

7. In an air craft, a balancing system comprising balancing devices for correcting the balance about one axis of the craft, a primary motor for operating the same, a motor controller therefor, a standard of position governing said motor controller, a secondary motor also operating said balancing devices, a second motor controller therefor set in operation by the initial movement of the primary motor to determine the direction of operation of the secondary motor, and additional means subject to the return toward normal movement of the primary motor to initiate movement of the secondary motor in the predetermined direction, together with means to effect the return of the secondary motor to normal subject to the return of the primary motor to normal.

8. In an air craft a balancing system comprising balancing devices, for correcting balance of the craft about one axis, primary and secondary operating motors for the same operating in response to the same variations in the position of the craft from normal as respects said axis, but operating differently, together with operating connections extending in common between said motors and said balancing devices.

9. A balancing system for air craft comprising a plurality of balancing devices associated with one axis of the craft, and two coöperating motor devices for operating the same, movements of both of which motors are governed in response to the movement of the craft from normal position, one motor acting on the balancing devices to set up corrective forces, and the other motor to set up checking forces.

10. A power operated balancing mechanism comprising primary and secondary power operated motors, control interconnections between said motors permanently and proportionally but asynchronously correlating the movements thereof, and a standard of position jointly controlling both said motors.

11. In an aircraft, a balancing system comprising balancing devices, power operated mechanism for operating said balancing devices, a rotary wind driven motor supplying power to said mechanism, and a standard of position responsive to variations in air rush controllably connected with said mechanism, whereby the air speed of the craft is controlled by said standard of position through directional changes and the speed of said wind driven motor is governed accordingly.

12. In an aircraft, a balancing system comprising balancing devices, a power operated mechanism for operating the same, a rotary wind driven motor supplying power to said mechanism and operating at a rate determined by the speed of the craft, and a wind pressure responsive device controlling the supply of power to said mechanism and through said mechanism affecting the speed of the craft.

13. In an air craft a balancing system comprising balancing devices, automatic means for operating the same, a changeable speed device connected with said automatic means and affecting the speed of operation of the balancing devices thereby, a wind pressure responsive device governing said change speed means, and means for adjusting the normal resistance to pressure of said wind pressure device at will.

14. In an air craft, a balancing system comprising lateral balancing devices, automatic operating means for the same, a vertical rudder and means for moving the same to steer the craft, and an interlock between said vertical rudder and said automatic balancing mechanism to lock the vertical rudder against movement from normal in one direction when the craft is laterally unbalanced in the other direction.

15. In an air craft, a balancing system comprising a vertical rudder, means for moving the same to steer the craft and a lock for said vertical rudder having two locking positions in one of which the vertical rudder is locked against movement in one direction and is free to be moved in the other, while in the other of which the vertical rudder is locked against movement in the other direction and is free to be moved in the one direction, and means responsive to change in the lateral balance of the craft to set said locking device according to the direction of the unbalancing.

16. In an air craft, a balancing system comprising a vertical rudder, means for moving the same to steer the craft, a lock for the vertical rudder having two locking positions in one of which said vertical rudder is locked against movement in one direction, and in the other of which said vertical rudder is locked against movement in the opposite direction, a lateral standard of position and operating connections between said standard and said locking device to set said lock in accordance with the lateral balance of the craft.

17. In an air craft, a balancing system comprising a vertical rudder, means for moving said rudder to steer the craft right and left, a lock for said vertical rudder having two positions in one of which said vertical rudder is locked against movement in one direction and in the other of which the said vertical rudder is locked against movement in the other direction, a movable part the position of which is changed when the lateral balance of the craft is changed, and connections between said movable part and said locking device whereby said locking device is operated to lock said vertical rudder against movement in a direction opposite to the direction of unbalancing of the craft.

18. In an air craft, a balancing system comprising a vertical rudder, means for operating the same, a lock for said vertical rudder adapted to be set to prevent movement of said rudder from normal in one direction or the other, a movable part the position of which is changed when the lateral balancing of the craft is changed, and connections between said movable part and said lock adapted to set said lock to prevent movement of said balancing rudder according to the direction of unbalancing of the craft.

19. In an air craft, a balancing system comprising a vertical rudder, means for operating the same, a lock for said vertical rudder adapted to be set to prevent movement of said rudder from normal in one direction or the other, a movable part the position of which is changed when the lateral balance of the craft is changed, and connections between said movable part and said lock adapted to set said lock to prevent movement of said balancing rudder according to the direction of unbalancing of the craft, together with means associated with said lock to permit free return to normal position of the rudder at all times.

20. In an air craft, a balancing system comprising a vertical rudder, means for operating the same comprising an operating lever having a yielding connection with said rudder, together with a lock between said yielding connection and said rudder and adapted to be set to prevent operation of said rudder in one direction or the other, and a movable part the position of which is changed when the lateral balance of the craft is changed having an operative connection with said lock.

21. In an air craft, a balancing system comprising a vertical rudder, a steering lever for operating said rudder having a yielding operating connection with said rudder, a lost motion device between said yielding connection and said rudder, lateral balancing devices for said craft, automatic balancing mechanism for operating said devices, a connection from said steering lever to said balancing mechanism whereby the normal lateral position of said craft is changed when the steering lever is moved to make a turn, and a lock for said steering rudder between said lost motion device and said steering rudder, having an operative connection with a movable part the position of which is changed when the position of the craft is changed, and adapted to be moved by said connection to lock said rudder against movement in one direction or the other according to the direction of unbalancing of said craft.

22. In an air craft, a balancing system comprising a pair of vanes mounted one at each lateral extremity of the craft, having movement in the horizontal plane, connected together for movement in unison in said plane, retained by said connection respectively in positions in which they are biased continuously about their axes by wind pressure from positions of appreciable head resistance to other positions of less head resistance, lateral balancing devices for the craft, and operating connections between said vanes and said balancing devices.

23. In an air craft, a balancing system comprising a pair of vanes pivoted on substantially vertical axes disposed toward the lateral extremities of the craft for movement thereabout, permanently connected to each other for movement in unison, the plane of each vane cutting its axis at an angle thereto, and each vane being biased continuously about its axis by wind pressure approximately in the direction of flight from a position of appreciable head resistance toward a position of lesser head resistance, balancing devices for said craft, and operating connections between said vanes and said balancing devices.

24. In an air craft, a balancing system comprising a pair of vanes mounted for movement about substantially vertical axes located one on each side of the craft, having connection with each other whereby they are forced to partake of their movement in unison, each of said vanes having portions oppositely inclined as respects its axis and disposed on opposite sides thereof, and each vane also being biased by wind pressure in the direction of flight to a position of least head resistance, lateral balancing devices for the craft, and operating connections between said vanes and said balancing devices.

25. In an air craft, a balancing system comprising a pair of pressure vanes mounted for movement about substantially vertical axes disposed one spaced from each side of the craft, having each an inclination to its axis, having each a portion rendering it permanently unbalanced by wind pressure approximately in the direction of flight as respects its axis, connected to each other for movement in unison, and each having a mass on one side of its axis greater than the mass on the other, lateral balancing devices for said craft, and operating connections between said vanes and said balancing devices.

26. In an air craft having wings, a balancing system comprising a pair of pressure vanes mounted one on each wing of the craft whereby they are subjected to differential pressures for movement about a substantially vertical axis, each presenting normally surfaces of substantial vertical projection normal to the line of flight, each having a portion unbalancing it under wind pressure as respects its axis, and a weight on one side greater than the weight on the other, and a connection between said vanes retaining them in their unbalanced positions and enforcing movement in unison about their axes in response to the unbalancing forces, together with balancing devices for the air craft, and operating connections between said balancing devices and said vanes.

27. In an air craft, a balancing system comprising a pair of pressure vanes mounted one on each side of the craft for movement about a vertical axis, each vane having a substantial vertical projection normal to the line of flight, each vane having a surface through which wind pressure during flight is unbalanced as respects its axis, said vanes being connected to each other for movement in unison in response to changes in wind pressure and said unbalancing forces, a third vane responsive to changes in the direction of the wind, differential connections between said third vane and the connected first two, lateral balancing devices for the craft, and operating connections between said differential connection and said balancing devices.

28. In an air craft, a balancing system comprising a pair of pressure vanes mounted one on each side of the craft for movement about a vertical axis, each vane having a substantial vertical projection, normal to the line of flight, each vane having a surface through which wind pressure during flight is unbalanced as respects its axis, and vanes being connected to each other for movement in unison in response to changes in wind pressure and said unbalancing forces, a third vane balanced as respects gravity responsive to changes in the direction of the wind, differential connections between said third vane and the connected first two, lateral balancing devices for the craft, and operating connections between said differential connection and said balancing devices.

29. In an air craft, a balancing system comprising a pair of pressure vanes mounted one at each lateral extremity of the craft, each normally presenting a substantial vertical projection normal to the line of flight and to the wind, each having connected therewith a surface unbalancing the wind pressure as respects its axis, connections between said surfaces effecting their movement in unison about said axes, lateral balancing devices for the craft, a power operated balancing mechanism for operating said balancing devices governed in its movement by the movements of said vanes, together with manual operating means for altering at will the positional relation of said vanes as respects said power operative mechanism.

30. In an air craft, a balancing system comprising a pair of pressure vanes located one at each lateral extremity of the craft and wholly without the horizontal projection of the same, each mounted in its location for movement about a substantially vertical axis, each having a substantial vertical projection normal to the line of flight and having a portion unbalancing the wind pressure as respects its axis, the surface of each vane on one side of its axis being inclined oppositely to said axis from the surface on the other.

31. In an air craft, a balancing system comprising a vane pivoted to move substantially in the plane of the craft, and having its opposite ends oppositely inclined as respects its pivot, whereby a turning moment is introduced by wind pressure oblique to the plane of the craft, and balancing devices for the craft having operative connection with said vane.

32. In an air craft, a balancing system comprising a pressure vane mounted for movement about a laterally extending horizontal axis, said vane being normally inclined at an acute angle to the horizontal and dissymmetrically disposed as respects said axis, yielding means retaining said vane in its inclined position against the pressure of the wind, and operating connections between said vane and longitudinal balancing devices for the craft.

33. In an air craft, a balancing system comprising a pressure vane mounted for movement about a laterally extending horizontal axis and normally occupying a position at a negative acute angle with respect to the horizontal, yielding means retaining said vane normally in said position, a longitudinal balancing device for the craft, control connections between said vane and said balancing device.

34. In an air craft, a balancing system comprising balancing devices, a power operated mechanism for operating the same including a follow-up device, a gravity controlled standard of position governing said power operated mechanism and subject to change with respect to the earth as respects said mechanism through said follow-up device, and a pressure responsive device active as the craft advances also having governing control of said power operating mechanism.

35. In a balancing system for air craft comprising a balancing device, together with a gravity controlled standard of position, a pressure responsive device active as the craft advances and independently of the balancing devices and a manual control means all differentially connected together to independently operate said balancing device whereby control of the balancing device may be effected through any one of said elements separately from the other.

36. A balancing system for air craft comprising balancing devices, a pressure responsive device connected to effect operation of said balancing devices upon change of pressure, a vertical steering rudder and means for operating the same, together with adjustable limit stops adapted to define the extent of movement of said vertical rudder and connected with said pressure responsive device for automatic adjustment thereby in response to pressure variations.

37. In an air craft a balancing system comprising balancing devices for the craft, a vertical steering rudder together with means for operating the same, adjustable limit devices adapted to define the extent of movement of said vertical rudder, and a pressure responsive device connected to operate said limit device in accordance with variations in wind pressure.

38. In an air craft, a balancing system comprising balancing devices and means for operating the same, said devices including a horizontal elevating rudder, an adjustable limit device adapted to define the extent of movement of said horizontal rudder, together with a pressure responsive device connected to operate said limit device in response to variations in wind pressure.

39. In an air craft, a balancing system comprising balancing devices including a horizontal elevating rudder, means fixing the range of movement of said horizontal rudder and a pressure responsive device having connections with said means for fixing the range of movement of said horizontal rudder whereby said means may be bodily shifted to shift bodily the range of movement in accordance with variations in wind pressure.

40. In an air craft, a balancing system comprising balancing devices including a horizontal elevating rudder, a means for operating the same including a steering lever which is moved to and retained in a position indicative of the position of the craft until and as long as the craft is in the indicated position, adjustable limit devices defining the extent of movement of said steering lever, and a pressure responsive device connected to adjust said limit devices in accordance with pressure variations.

41. A balancing system for air craft comprising balancing devices including a horizontal rudder, a manual control lever and connections for manually operating said horizontal rudder, and adjustable limit devices defining the extent of said manual operation of said rudder, and a pressure responsive device connected to adjust said limit device in response to variations in wind pressure.

42. In an air craft, a balancing system comprising balancing devices including a horizontal rudder, an operating lever for the same together with operating connections with the horizontal rudder adapted to permit the lever to be moved to and retained in a position indicative of the position of the craft as long as the craft is in said position, an ordinary manual operating lever through which the rudder may be moved independently of the first named lever and by which the second named lever occupies a position indicative of the degree of movement imparted to the rudder thereby, together with an adjustable limit device common to said first and second named rudders and defining the extent of movement thereof, and a pressure responsive device connected to adjust said limit device in accordance with the variations in wind pressure.

43. In an air craft, a balancing system comprising balancing rudders, means for operating the same, adjustable means for varying the amplitude of the movement of said balancing devices, resulting from a given movement of said operating means, and a pressure responsive device connected to adjust said means for amplitude variation in response to variations in wind pressure.

44. In an air craft, a balancing system comprising lateral balancing devices, means for operating the same, a vertical steering rudder and connections between said vertical rudder and said balancing devices to bank the craft when the steering rudder is moved to make a turn, adjustable means for altering said connection to vary the angle of bank for a given angle of turn, and a pressure responsive device connected to adjust said adjusting means of said banking connection in response to variations in wind pressure.

45. In an air craft, a balancing system comprising a vertical rudder, means for moving the same, a movable part connected to be moved whenever the vertical rudder is moved and in substantial proportion to the angle of movement thereof, propelling means for the craft, a power controlling device therefor, and connections from the aforesaid movable part to the said power controlling device.

46. In an aircraft comprising a main supporting member which constitutes the lifting body of the craft, a pair of pilot balancing devices one on each side of said main supporting member and presenting coöperating surfaces arranged to be normally acted upon in flight by air pressure to produce torque in opposite directions about the longitudinal axis of the craft, said devices being connected to each other and each responsive to temporarily preponderating pressure thereon to increase the torque of the other, together with lateral balancing rudders for the craft and control connections between said devices and said balancing rudders.

47. In an aircraft comprising a main supporting member which constitutes the lifting body of the craft, a pilot balancing device upon each side of said main supporting member and presenting coöperating surfaces arranged to be normally acted upon in flight by air pressure to produce torque in opposite directions about the longitudinal axis of the craft, said balancing devices being connected to each other and each responsive to temporarily preponderating pressure thereon to increase the torque of the other, each acted upon through gravity when the craft is unbalanced to the increase of its own torque, together with balancing rudders for the craft and control interconnections between said pilot balancing devices and said balancing rudders whereby said balancing rudders are governed through movement of said pilot devices.

48. An aircraft comprising a main supporting member which constitutes the lifting body of the craft, a pilot balancing device upon each side of said main supporting member presenting coöperating surfaces arranged to be normally acted upon in flight by air pressure to produce torque in opposite directions to the longitudinal axes of the craft, and also presenting coöperating surfaces similarly acted upon to produce torques in opposition to the first named torque, said balancing devices being connected to each other and each responsive to temporarily preponderating pressure thereon to increase the torque of the other, but each acted upon through gravity when the craft is unbalanced to the increase of its own torque, balancing rudders for the craft, and control interconnections between said balancing rudders and said pilot devices whereby actuation of said balancing rudders is effected through control movement of said pilot devices.

49. In an aircraft a balancing system comprising a pressure vane inclining normally rearwardly and upwardly at substantially acute angles both to the longitudinal and vertical axes of the craft, pivoted on a transverse axis lying vertically to one side of its center of pressure, and having yielding means retaining it in normal position against air rush substantially parallel to the longitudinal axis, whereby upon the decrease of velocity or pressure of the air rush it moves forwardly into the air rush, and on increase of velocity of pressure thereof, rearwardly with the air rush, but upon change of direction of the air rush with respect to the longitudinal axis of the craft, it moves in one direction for one change and another direction for the opposite change, and longitudinal balancing devices of the craft connected with said plane for control thereby.

50. In an aircraft, a balancing system comprising an anemometer device registering changes in pressure of the air rush and a standard of the position of the craft with respect to the earth independent of and unaffected by the velocity changes of the craft or the air rush, together with longitudinal balancing devices for the craft controlled combinedly thereby.

51. In an aircraft a balancing system comprising a pressure vane inclining normally rearwardly and upwardly at substantially acute angles both to the longitudinal and vertical axes of the craft, pivoted on a transverse axis lying vertically about one side of its center of pressure, and having yielding means retaining it in normal position against air rush substantially parallel to the longitudinal axis, whereby upon the decrease of velocity or pressure of the air rush it moves forwardly into the air rush, and on increase of velocity or pressure thereof, rearwardly with the air rush, but upon change of direction of the air rush with respect to the longitudinal axis of the craft, it moves in one direction for one change and another direction for the opposite change, a standard of position with respect to the earth independent of velocity changes of the craft or the air rush, longitudinal balancing devices for the craft controlled jointly by said pressure vane and said standard of position.

52. In combination power control means for a driving motor, a vertical rudder, and a connection between said vertical rudder and said control means operable upon manipulation of said rudder to affect the normal operation of said control means.

53. In combination an elevating rudder, operating means therefor, an anemometer control device, and an interlock between these two elements affecting the degree of control which may be exercised by the operating means.

54. In an aircraft, a balancing system comprising balancing devices, a power operated mechanism for operating the same including a follow-up device, a standard of position defining a fixed relation to the surface of the earth and governing said power operated mechanism, which standard is subject to change of positional relation as respects said mechanism through said follow-up device, and a pressure responsive device active as the craft advances also having governing control of said power operating mechanism.

55. In an aircraft comprising a main supporting member which constitutes the lifting body of the craft, a pair of pilot surfaces, one located on each side of said main supporting member and presenting surfaces arranged to produce forces acting angularly in opposite directions, said pilot surfaces being connected to oppose said forces to each other and to produce a resultant movement of said surfaces in proportion to said resultant force, lateral balancing rudders for the craft, control interconnections between said pilot surfaces and said balancing devices, and means acting through said connections to effect the banking of the craft.

56. A power operated balancing instrument comprising a pair of asynchronously operated servo motors, means controlling said motors, and balancing rudders for the craft connected with said motors for operation thereby.

57. In an aircraft, a balancing system comprising a pressure vane inclining normally rearwardly and upwardly at substantially acute angles both to the longitudinal and vertical axes of the craft and mounted for bodily movement with respect thereto, yielding means biasing it against air rush in a direction substantially parallel to the longitudinal axis of the machine, whereby upon the decrease of velocity or pressure of air rush it moves upwardly, and on increase of velocity or pressure thereof downwardly, but upon change of direction of air rush with respect to the longitudinal axis of the craft, it moves in one direction for one change and in another direction for the opposite change, a standard of position with respect to the earth and longitudinal balancing devices for the craft controlled jointly by said pressure vane and said standard of position.

58. In an aircraft, a longitudinal balancing system comprising an anemometer device operatively disposed in such relation to the direction of air rush as to register pressure dissymmetrically upon change of direction of the air rush in opposite directions from normal, a standard of position of the craft with respect to the earth, and longitudinal balancing devices for the craft controlled combinedly thereby.

59. In an aircraft, a longitudinal balancing system comprising longitudinal balancing devices, a pressure vane mounted for movement about a laterally extending horizontal axis and disposed with respect thereto so that pressure of air rush acting thereon is dissymmetrically disposed as respects said axis, yielding means retaining said vane in a position at an acute angle to the horizontal against said pressure, and operating connections between said vane and the longitudinal balancing device for the craft.

60. In an aircraft, a balancing system comprising a pilot control device the surfaces of which have a negative acute angle only to the line of flight, mounted for movement of translation transversely of the line of flight in response to variation in pressure of air rush, means independent of air rush biasing said surfaces for movement against it, and operating connections between said pilot surfaces and the longitudinal device for the craft.

61. A balancing system for an aircraft including a standard of position comprising a pair of vanes pivoted on substantially vertical axes and connected together for simultaneous movement thereabout, said vanes being located toward opposite extremities of the craft and each biased continuously about its axis by wind pressure in the direction of flight from positions of appreciable resistance toward a position of lesser resistance thereto, together with lateral balancing devices for the craft, and operating connections between said vanes and said balancing devices.

62. In an aircraft, a balancing system comprising a pressure vane inclining normally rearwardly and upwardly at substantially acute angles both to the longitudinal and vertical axes and mounted for bodily movement with respect thereto, yielding means biasing it against air rush in a direction substantially parallel to the longitudinal axis of the machine, whereby upon the decrease of velocity or pressure of air rush, it moves upwardly, and on increase of velocity or pressure thereof, downwardly, but upon change of direction of air rush upwardly it moves upwardly and upon change of air rush downwardly it moves downwardly, a standard of position with respect to the earth, and longitudinal balancing devices for the craft controlled jointly by said pressure vane and said standard of position.

63. In a flying machine provided with a lateral stabilizing surface at each side of the longitudinal axis thereof, propelling means therefor, a source of power independent of the propelling means, means for oppositely moving the stabilizing surfaces on opposite sides of the machine to vary the angle of incidence thereof and balance the machine, a vane pivotally mounted to swing in a horizontal plane adapted to be actuated by air currents, and means intermediate the vane and the independent power whereby movement of the vane from neutral position applies the power to move the surfaces to recover the balance, and automatic means adapted to produce an offset in the said intermediate means whereby the stabilizing surfaces are reset prior to the return of the vane to a normal position thereby maintaining the machine in equilibrium in opposition to the disturbing air currents.

64. In a flying machine provided with a stabilizing surface at each side of the longitudinal axis thereof, propelling means therefor, a source of power independent of the propelling means, means for oppositely moving the said surfaces on opposite sides of the machine to vary the angle of incidence thereof and balance the machine, a swinging weight, mechanism intermediate the weight and independent power whereby movement of the weight from neutral position applies the power to operate the moving means, vanes pivotally mounted to swing in a horizontal plane connected with the said intermediate mechanism whereby movement of the vanes from neutral position applies the independent power to operate the moving means, and means coöperative with the intermediate mechanism adapted to produce an offset therein, whereby the power is applied to vary the said angle of incidence in the reverse manner prior to the return of the weight or the vanes or both to neutral position.

65. In an aeroplane, propelling means therefor, a power device maintained in operation through movement of the machine through the air, means for maintaining the machine in lateral balance, automatic means for controlling the line of flight in a vertical plane to maintain the machine in fore-and-aft balance, two instrumentalities actuated respectively by disturbance of the lateral or fore-and-aft balance adapted to apply the power of said device to operate the lateral or fore-and-aft balancing means, and automatic means for operating said controlling means to turn the machine to a descending angle, said last named means being actuated by a decrease in the speed of movement of the machine through the air.

66. In a flying machine, the combination of automatic means for maintaining the horizontal angle of flight thereof, manual means for determining said angle, and independent means for altering the relationship of said manual means to said automatic means to limit the range of manual control over the descending flight of the machine.

67. In a flying machine, the combination of automatic means for maintaining the horizontal angle of flight thereof, manual means for determining said angle, and independent means controlled by air resistance, for altering the relationship of said manual means to said automatic means to limit the range of manual control over the descending flight of the machine.

68. In a flying machine, the combination of automatic means for maintaining the horizontal angle of flight thereof, manual means for determining said angle and independent means for altering the relationship of said manual means to said automatic means to limit the range of manual control over the angle of flight of the machine.

69. In a flying machine, the combination of means for steering the machine in the vertical, including a manual device controlling the steering of the machine within and through a certain range of vertical angles and apparatus for automatically limiting the range of vertical angles through which the machine may be steered through the use of said device.

70. In a flying machine, the combination of automatic means for maintaining the horizontal angle of flight of the machine, manual means for steering the machine in the vertical, apparatus to alter the relationship of the manual means to the automatic means to prevent the machine being set in the vertical to a dangerous angle, and manual means for setting the machine at another and different angle.

71. In a flying machine, the combination of automatic means for maintaining the horizontal angle of flight of the machine, apparatus for automatically regulating the angle to the horizontal of the descending flight of the machine and manual means for superseding said apparatus and permitting the determination of a different angle.

72. In a flying machine, the combination of a plane, means for tilting the plane, controlling apparatus for said means including a directional air-operated vane and a gravity operated weight through which said vane acts and mechanism controlled by said means for offsetting the effect of said apparatus on said means.

73. In a flying machine provided with stabilizing surfaces substantially equally disposed on each side of the longitudinal axis thereof, and an elevating plane whose angle of incidence determines the angle of the longitudinal axis of the machine with respect to the horizontal, mechanism actuated by force tending to disturb the lateral balance of the machine and means controlled thereby for oppositely altering the angle of incidence of the stabilizing surfaces to recover said balance, a directional vane actuated by air currents also controlling said means, devices coöperating with said means and adapting the same for resetting the stabilizing surfaces at the angle required to maintain the machine in lateral balance in opposition to the disturbing force, means actuated by force tending to change the angle of the longitudinal axis of the machine in respect to the line of flight for altering the angle of incidence of the elevating plane and automatic means for returning the elevating plane to the angle of incidence required to maintain the fore and aft balance in the desired line of flight in opposition to disturbing forces.

74. In a flying machine provided with sustaining planes, means for tilting the machine about a longitudinal axis, a device whose actuation is controlled by the tilting movement of the machine, mechanism including an air-operated vane and said device governing said means and apparatus for offsetting the effect of said mechanism on said means.

75. In a flying machine provided with sustaining planes, means for tilting the machine about a longitudinal axis, mechanism including an air-operated vane and a gravity operated weight governing said means and apparatus for offsetting the effect of said mechanism on said means.

76. In a flying machine provided with sustaining planes, means for tilting the machine about a longitudinal axis, a device whose actuation is controlled by the tilting movement of the machine, mechanism including an air-operated vane and said device governing said means and apparatus controlled by the means for offsetting the effect of said mechanism on said means.

77. In a flying machine, the combination of sustaining planes, means for tilting the machine about a longitudinal axis, a device whose actuation is controlled by the tilting movement of the machine, a directional vane whose actuation is controlled by the air, mechanism controlled jointly by said device and said vane governing the tilting means and apparatus for offsetting the effect of said mechanism on said means.

78. In a flying machine, the combination of sustaining planes, means for tilting the machine about a longitudinal axis, a gravity operated device and an air-actuated directional vane, mechanism controlled jointly by said device and said vane controlling the tilting means and apparatus controlled by the tilting means for offsetting the effect of said mechanism on said means.

79. The combination of an elevating rudder, a manual operating means and an anemometer operating device therefor with a safety device comprising connections from the anemometer device for affecting the control of the manual means by the operator.

80. In an aircraft, means controlling the longitudinal balance thereof comprising an aerofoil surface continuously yieldingly biased against air rush and arranged to be moved against its bias by increase in pressure of air rush and also by one change from normal of the direction of the air rush, but moved with its bias by decrease of pressure of the air rush and also by the opposite change from normal of the direction of the air rush.

81. In an aircraft, means controlling the longitudinal balance thereof comprising an aerofoil surface continuously yieldingly biased against air rush and arranged to be moved against its bias by increase in pressure of air rush, and also by change in direction of air rush upwardly, but to be moved with its bias by decrease of pressure of air rush and also by change of direction of air rush downwardly.

82. In an aircraft, means for controlling the longitudinal balance thereof comprising an aerofoil surface continuously yieldingly biased against air rush and arranged to be moved against its bias by increase in pressure or velocity of air rush and also by one change from normal of the direction of the air rush, but moved with its bias by decrease in pressure or velocity of air rush and also by the opposite change from normal of the direction of the air rush, and said surface having associated therewith an element constituting a standard of position of the craft with respect to earth, the controlling movements of which standard are coördinated with the controlling forces of said aerofoil surface.

83. In an aircraft, means for controlling the longitudinal balance thereof comprising an anemometer device continuously generating controlling forces through changes in conditions of air rush, together with a standard of position with respect to earth generating controlling forces through change in attitude of the craft with respect to earth and having its controlling forces continuously coördinated with the controlling forces of said anemometer device in the control of the craft.

84. In an aircraft, means controlling the longitudinal balance thereof comprising an aerofoil surface continuously yieldingly biased against air rush and arranged to be moved against its bias by increase in pressure of air rush and also by one change from normal of the direction of the air rush, but moved with its bias by decrease of pressure of the air rush and also by the opposite change from normal of the direction of the air rush, a servo-motor controlled by said surface movements, a follow up device coordinating the movements of the servo-motor to the movements of the surface, and longitudinal balancing rudders controlled thereby.

85. In an aircraft, means for controlling the longitudinal balance thereof comprising an anemometer device continuously generating controlling forces through changes in conditions of air rush, together with a standard of position with respect to earth generating controlling forces through change in attitude of the craft with respect to earth and having its controlling forces continuously coördinated with the controlling forces of said anemometer device in the control of the craft, a servo-motor controlled through said coördinated forces, a follow-up device coördinating the movements of the servo-motor to the said controlling forces, and longitudinal balancing rudders controlled by said servo-motor.

86. In an aircraft, means controlling the longitudinal balance thereof comprising an air rush responsive device continuously partaking of control movements proportional to changes in air rush conditions, together with a standard of position with respect to the earth partaking of relative movements with respect to the craft proportional to the change in attitude of the craft with respect to the earth and having its control movements continuously coördinated with the control movements of said air rush responsive device.

87. Apparatus for the automatic control of vehicles comprising a standard of positions with respect to the earth, a servo-motor controlled thereby mounted on the vehicle, a manually actuated part for effecting the operation of said servo-motor, and a part affected by the relative velocity of the vehicle affecting control of said manually actuated part and continuously controlling the movement of the vehicle.

88. Apparatus for the automatic control of vehicles comprising a standard of position with respect to the earth, a servo-motor controlled thereby mounted on the vehicle, a manually actuated part for effecting the operation of said servo-motor, and a part affected by the relative velocity of the vehicle continuously effecting both the back and forth control of said manually actuated part and simultaneously effecting an alteration in the movement of the vehicle.

89. In a flying machine, the combination of automatic means for maintaining the longitudinal balance of the machine, manual means for steering the machine in the vertical, and air rush controlled apparatus to alter continuously the relationship of the manual means to the automatic means to prevent the machine being set in the vertical to a dangerous angle.

90. In a flying machine, the combination of automatic means for maintaining the longitudinal balance of the machine, manual means for steering the machine in the vertical, and an air rush controlled apparatus to alter the relationship of the manual means to the automatic means from both extremities of movement of the manual means, to prevent the machine being set in the vertical to a dangerous angle.

91. Apparatus for the automatic control of vehicles comprising a standard of position with respect to the earth, a servo motor controlled thereby mounted on the vehicle, a manually actuated part for effecting the operation of said servo-motor, and a part affected by the relative velocity of the vehicle affecting control of said manually actuated part and at each of a plural number of speeds simultaneously effecting an actuation in the movement of the vehicle.

92. In an aeroplane, a standard of position with respect to the earth, a servo-motor for controlling the stabilizing planes, and a part affected by the relative velocity of the aeroplane continuously changing the effective relation between the standard and the servo-motor whereby the angle of incidence is changed to volplane the machine whenever the danger point in relative speed is approached.

93. In a flying machine provided with sustaining planes, means for tilting the machine about a longitudinal axis, a device whose actuation is controlled by the tilting movement of the machine, mechanism including an air rush responsive element and said device governing said means and a follow up apparatus for offsetting the effect of said mechanism on said means.

94. In a flying machine provided with sustaining planes, means for tilting the machine about a longitudinal axis, a device whose actuation is controlled by the tilting movement of the machine, mechanism including said device and an air rush actuated element responsive both to changes in relative velocity and incidence of the air rush as respects the sustaining planes for governing said means, and a follow up apparatus for offsetting the effect of said mechanism on said means.

95. In a flying machine provided with sustaining planes, means for tilting the machine about a longitudinal axis, a device whose actuation is controlled by the tilting movement of the machine, mechanism for governing said means including said device and a pair of differentially acting air rush pressure responsive surfaces symmetrically located as respects the longitudinal axis of the craft, and a follow up apparatus for offsetting the effect of said mechanism on said means.

96. In an aircraft comprising a main supporting member which constitutes the lifting body of the craft, a pair of pilot balancing surfaces one on each side of said main supporting member and presenting coöperating surfaces arranged to be acted upon in flight by air pressure to produce torque in opposite directions about a principal axis of the craft, said surfaces being connected to each other and each responsive to temporarily preponderating pressure thereon to increase the torque of the other, together with lateral balancing rudders for the craft and control connections between said surfaces and said balancing rudders.

97. In a flying machine, the combination of mechanism for banking said machine, a vane controlled by the air and a movable weight, each exercising control over said banking mechanism, transmitting mechanism intermediate the vane and weight and said mechanism, offsetting means and apparatus controlled by said offsetting means for affecting said transmitting means, whereby as the machine swings toward normal position the operation of the banking mechanism is reversed before such machine returns to normal position.

98. In a flying machine, normally in a state of equilibrium, devices for driving said machine including an engine, means for tilting the machine from the horizontal plane including a source of power operable independently of said engine and apparatus for controlling said means including a directional air-operated vane, mechanism whose controlling effect is governed by the deflection of the machine from equilibrium, and offsetting devices governed by the first named means.

99. In a flying machine provided with lateral sustaining planes having lateral balancing means, automatic means for altering the angle of incidence of said balancing means to balance the machine, including pivotally mounted vanes adapted to be actuated by air currents to cause the operation of the automatic means, and mechanism coöperative therewith determining the extent of such alteration of the angle of incidence of said balancing means, whereby the machine is maintained in equilibrium in opposition to unbalancing forces.

100. In a flying machine provided with sustaining planes, means for tilting the machine about a longitudinal axis, a servo-motor for actuating said means, differentially acting pilot surfaces one toward each lateral extremity of the machine controlling said servo-motor, and a follow-up mechanism offsetting the effect of said pilot surfaces on said servo-motor, whereby the machine is maintained in equilibrium in opposition to unbalancing forces.

101. In an aircraft, an anemometer device, means to steer the craft up and down controlled by said anemometer device, manual control means for said steering means independent of actuation of said anemometer device, and a limiting device associated with said manual control means and arranged to limit the extent of movement of said steering means thereby to safe angles of inclination of the machine.

102. In an aircraft, an anemometric device, means to steer the craft up and down controlled by said device, and adjustable means to set the angular range of inclination of said craft in response to said anemometric control limited in its adjustment to safe angles of inclination.

In testimony whereof I affix my signature in presence of two witnesses.

JOHN P. TARBOX.

Witnesses:
C. S. GRUMMAN,
H. H. LOWENSTEIN.